United States Patent [19]
Kojima et al.

[11] Patent Number: 5,650,867
[45] Date of Patent: Jul. 22, 1997

[54] FUNCTIONAL SUBSTRATE FOR CONTROLLING PIXELS

[75] Inventors: Makoto Kojima, Hino; Yutaka Inaba, Kawaguchi; Tatsuo Murata, Oume; Hideaki Takao, Sagamihara, all of Japan

[73] Assignee: Canon Kabushiki Kaisha, Tokyo, Japan

[21] Appl. No.: 24,489

[22] Filed: Mar. 1, 1993

Related U.S. Application Data

[62] Division of Ser. No. 398,989, Aug. 28, 1989, Pat. No. 5,212,575.

[30] Foreign Application Priority Data

| Aug. 30, 1988 | [JP] | Japan | 63-217210 |
| Oct. 25, 1988 | [JP] | Japan | 63-270093 |
| Dec. 14, 1988 | [JP] | Japan | 63-316763 |
| Dec. 28, 1988 | [JP] | Japan | 63-328821 |
| Dec. 28, 1988 | [JP] | Japan | 63-328823 |
| Mar. 10, 1989 | [JP] | Japan | 1-056026 |

[51] Int. Cl.⁶ ............................................. G02F 1/13
[52] U.S. Cl. ............... 349/104; 428/207; 428/433; 349/110; 349/139; 349/158
[58] Field of Search ................... 359/67, 62, 66, 359/82, 87, 88; 430/7, 293, 294; 428/207, 433

[56] References Cited

U.S. PATENT DOCUMENTS

| 4,367,924 | 1/1983 | Clark et al. | 350/347 R |
| 4,383,017 | 5/1983 | Hirofumi et al. | 430/7 |
| 4,639,089 | 1/1987 | Okada et al. | 350/341 |
| 4,728,176 | 3/1988 | Tsuboyama et al. | 359/66 |
| 4,802,743 | 2/1989 | Takao et al. | 359/66 |
| 4,867,537 | 9/1989 | Aoki et al. | 350/336 |
| 4,917,471 | 4/1990 | Takao et al. | 350/339 F |
| 4,934,791 | 6/1990 | Shimizu et al. | 350/339 R |
| 4,988,168 | 1/1991 | Dickerson et al. | 350/334 |

FOREIGN PATENT DOCUMENTS

| 129707 | 7/1985 | Japan | 359/82 |
| 62-14622 | 1/1987 | Japan | 359/66 |
| 62-90625 | 4/1987 | Japan | 359/66 |
| 212603 | 9/1987 | Japan | 359/82 |
| 60425 | 3/1988 | Japan | 350/336 |
| 226626 | 9/1988 | Japan | 350/336 |
| 241522 | 10/1988 | Japan | 350/339 F |
| 63-273834 | 11/1988 | Japan | 359/66 |
| 314521 | 12/1988 | Japan | 350/336 |
| 1-9425 | 1/1989 | Japan | 359/66 |

*Primary Examiner*—Minh-Loan Tran
*Attorney, Agent, or Firm*—Fitzpatrick, Cella, Harper & Scinto

[57] ABSTRACT

A process for the preparation of a color filter, comprising repetitively forming a patterned opaque film and a photosensitive colored resin film on a substrate and exposing the resin film to exposure from the back side of the substrate using the pattern as a mask; and a color filter prepared by the process.

6 Claims, 17 Drawing Sheets

EXPOSURE

EXPOSURE

EXPOSURE

FUNCTIONAL SUBSTRATE FOR CONTROLLING PIXELS

This application is a division of application Ser. No. 398,989, filed Aug. 28, 1989, now U.S. Pat. No. 5,212,575.

BACKGROUND OF THE INVENTION

1. Field of the Invention

The present invention relates to a functional substrate provided with a color filter, which is used in a color liquid crystal display, in particular, a color ferroelectric liquid crystal display as a display device, or in a color image pickup unit as an input device.

2. Related Background Art

Hitherto well known are liquid crystal devices in which scanning electrodes and signal electrodes are formed in a matrix fashion and the spaces between the electrodes are filled with liquid-crystal compounds to form a large number of picture elements (pixels) so that an image or information can be displayed. Employed as a system of driving such display devices is time-sharing drive wherein address signals are selectively applied to the scanning electrodes in a successive and periodic fashion and given information signals are selectively applied to the signal electrodes in a synchronous and parallel fashion to the address signals.

In recent years, aiming at making larger the screen of liquid crystal display units, it is progressed to use the surface-stabilized ferroelectric liquid crystal devices disclosed, for example, in U.S. Pat. No. 4,367,924 and No. 4,638,088. As the screen is made larger, the scanning electrode and signal electrode of the matrix electrode have become increasingly long, so that the effect of delaying an applied voltage (or applied-voltage delay effect) has brought about a serious problem.

Conventional TN (twisted nematic) liquid crystal devices or STN (super twisted nematic) liquid crystal devices employ multiplexing drive in which the applied voltage is periodically applied (namely, a single picture with a high contrast is formed by plural-frame scanning), and hence the lowering of display quality level, ascribable to the applied-voltage delay effect mentioned above, has been little questioned. In the instance of the ferroelectric liquid crystal device, however, a single picture with a high contrast must be formed by single-frame scanning, so that the applied-voltage delay effect mentioned above has brought about a serious problem. Heat generation accompanying wiring resistance is also incidental to such a delay effect to cause a non-uniformity of temperature distribution in cells, resulting also in a lowering of display quality level.

For the foregoing reasons, in applying the ferroelectric liquid crystal device to a large screen display panel, a method has been employed in which a metallic film or an alloy film is wired in contact in the longitudinal direction of the scanning electrode and signal electrode so that the applied-voltage delay effect can be suppressed or eliminated. In an instance in which the above delay effect is suppressed by using thick-wall transparent electrodes as the scanning electrode and signal electrode, the transmittance in a light state is also lowered, resulting in a low contrast and low brightness of the picture.

Incidentally, as having been made clear in the U.S. Patents set out above, in embodying the surface-stabilized ferroelectric liquid crystal device, the space between substrates is required to be set with a distance small enough to suppress the specific spiral arrangement structure of a ferroelectric smectic liquid crystal and give a bistably oriented state, i.e., a distance of usually from 0.1 µm to 3 µm in approximation.

Experiments made by the present inventors revealed that the film thickness of a low-resistivity conductive film used for suppressing the applied-voltage delay effect, which is used when the surface-stabilized ferroelectric liquid crystal device is applied to a large screen display panel, may be brought into a thick-wall state of not less than 0.1 µm, and preferably not less than 0.5 µm, thereby making it possible to better preventing the lowering of display quality level, ascribable to the delay effect.

However, the wiring of the above thick-wall low-resistivity conductive film in contact with the transparent electrodes has brought about the problem that a danger of a short between the upper and lower substrates increases at the part such wiring is made. In a disply screen, existence of even only one shorted part can be found by a viewer, thus making a serious problem from the viewpoint of the display quality level.

In the ferroelectric liquid crystal device, rubbing is applied on the surface of the substrate so that liquid crystal molecules may be arranged in a given direction. In applying this rubbing, there has been the problem of a phenomenon that the protruded part of the low-resistivity conductive film causes peeling.

In color display using a liquid crystal display panel, a color filter for full colors that employs an integrated body of fine microfilters for R (red), G (green) and B (blue) is provided on the liquid crystal display panel so that the color display can be reproduced using light rays passed through the liquid crystal display panel capable of optical switching with the color filter.

Color filters used for such purpose are disclosed, for example, in Japanese Unexamined Patent Publications No. 57-16407, No. 57-74707, No. 60-129707, No. 62-212603 and No. 62-218902.

In the above prior art, however, the following problems have been involved from the viewpoints of fabrication processes and color reproducibility.

(1) In the process of forming a colored resin layer, exposure to light is carried out using a photomask, with alignment at the desired position. However, there is a limit in the alignment precision, and hence it often occurs that a gap is made between the color resin layer and a light-screening layer or that the colored resin layer is formed overlapping on the light-screening layer. This gap results in a lowering of contrast in the case of liquid crystal display devices. In the case of image pickup devices, on the other hand, a flare phenomenon is caused to make an image difficult to view. The overlapping between the light-screening layer and colored resin layer may also give cell gap irregularities in the case of liquid crystal display devices to cause orientation disturbance, resulting in a lowering of the display quality level.

(2) In order to cure the colored resin in the process of forming the colored resin layer, the exposure is carried out from the surface. Hence, the photo-curing sufficiently takes place at the area near to the surface but insufficiently at the interface with the substrate, so that, at the time of developing, cracking and turning-up and peeling of patterns tend to occur, and the stability of the process can be by no means well satisfactory.

(3) In instances in which a material having a high reflectance (as exemplified by a metal) is used in the light-screening layer when the surface exposure is made, a photosensitive colored resin film on the light-screening layer may be cured with a great influence of the light that reflects around as a result of the exposure, making it difficult to carry out development.

(4) In the above prior art, all instances essentially require the operation of alignment between the formation of a color filter pattern and the formation of a non-light-transmissive film pattern. Hence, there has been the problem that the influence on the precision of this alignment makes it difficult to form between color filter patterns a non-light-transmissive film pattern free of any light-transmissive area and coincident in size. When the overlapping has occurred between these, there also has been the problem that a faulting (a difference in level) made on the color filter makes it difficult to form a color filter having a structural strength and an excellent flatness.

The above four points have been serious problems from the viewpoints of fabrication processes and color reproducibility.

SUMMARY OF THE INVENTION

An object of the present invention is to provide a functional substrate that has solved the above problems, and also provide a functional substrate using a color filter that can be used in color display devices or image pickup devices.

Another object of the present invention is to provide an optical modulator that has solved the above problems, and, in particular, a surface-stabilized ferroelectric liquid crystal device capable of suppressing a short from occurring.

The present invention can be achieved by a functional substrate for controlling pixels, comprising:

a) a substrate;

b) an insulating film provided on said substrate;

c) a stripe-shaped transparent conductive film provided in plurality on said insulating film;

d) an opaque conductive film covered with said insulating film, arranged in parallel to said stripe-shaped transparent conductive film, and disposed between two stripe-shaped transparent conductive films adjacent to each other; and e) a contact area at which one of said two stripe-shaped transparent conductive films adjacent to each other and said opaque conductive film are electrically connected.

DETAILED DESCRIPTION OF THE PREFERRED EMBODIMENTS

Figure 1:
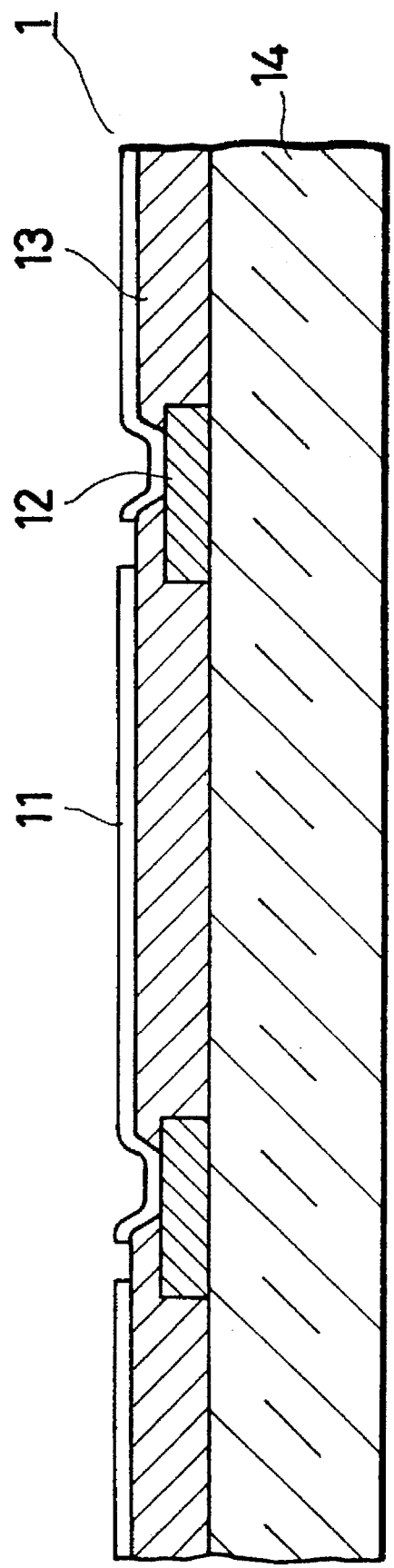
FIG. 1 is a cross section of an electrode substrate used in the present invention.
Figure 2:
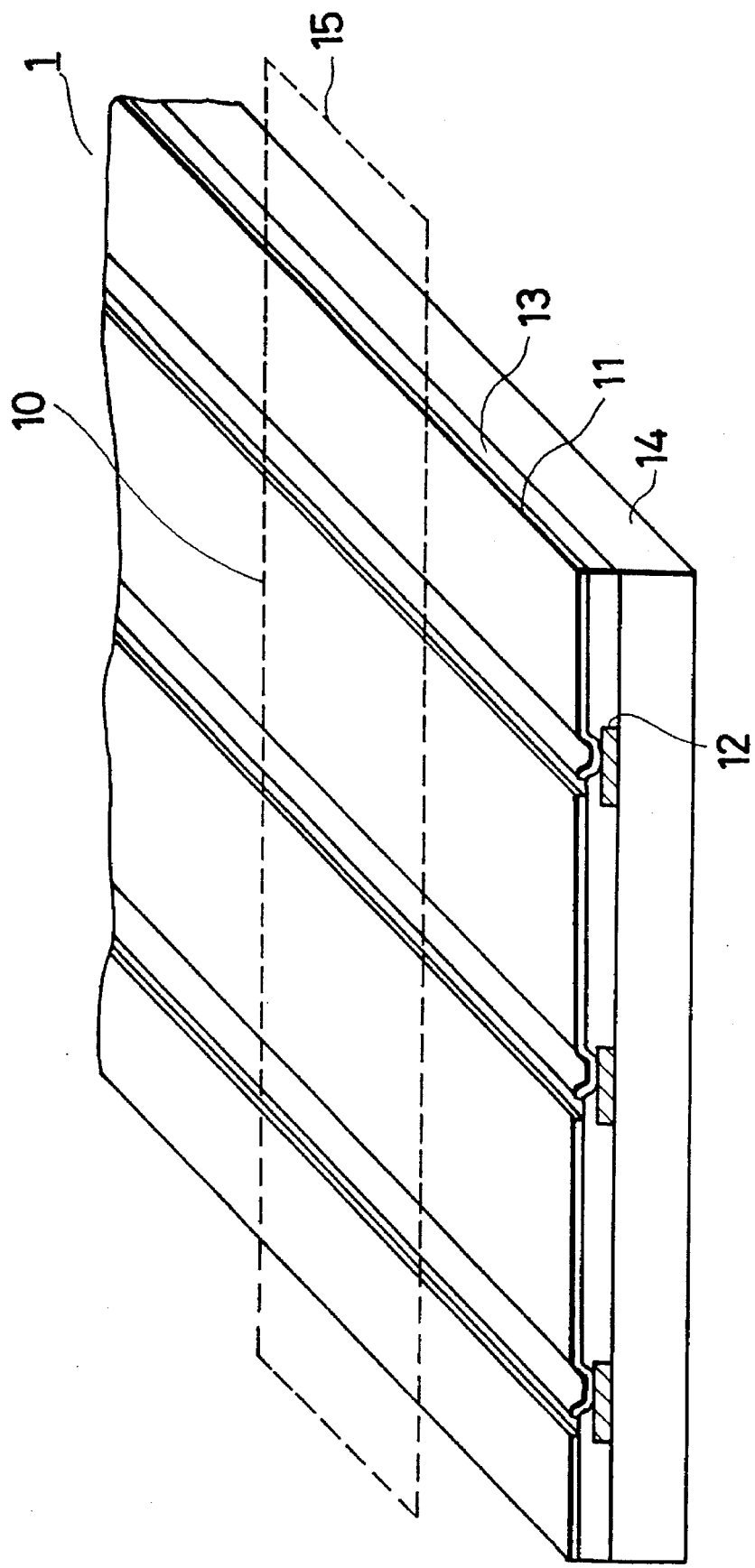
FIG. 2 is a perspective view thereof.

FIG. 1 is a cross section of the substrate used in the present invention, and FIG. 2 is a perspective view thereof. In FIGS. 1 and 2, the numeral 14 denotes a substrate, for which a glass sheet or plastic sheet is used. The numeral 11 denotes a transparent electrode of 100 Å to 5,000 Å thick, formed of a transparent conductive film (made of, for example, indium oxide, tin oxide, indium-tin oxide: ITO), and is used as a scanning electrode or signal electrode in the multiplexing drive. This transparent electrode 11 is provided on insulating film 13 formed on the substrate 14.

In the present invention, low-resistivity electrode 12, comprising a conductive film formed by vacuum deposition or sputtering of a metal such as aluminum, chromium, gold, silver, copper, molybdenum and tungsten, or an alloy thereof, is formed on substrate 14. This low-resistivity electrode 12 is electrically connected to transparent electrode 11 in its longitudinal direction through a through-hole formed in insulating film 13.

In this constitution, low-resistivity electrode 12 can also function as a light-screening film when it is disposed between transparent electrodes 11 adjacent to each other, in the manner that it covers the space between the electrodes. In regard to the ferroelectric liquid crystal present at the space between transparent electrodes 11 (which corresponds to a non-picture element area), the direction of orientation of liquid crystal molecules can not be controlled by an applied voltage, and hence the state of orientation at the initial orientation stage is maintained as it is. Thus, because of the liquid crystal oriented in two different molecular axes in the initial orientation state of the ferroelectric liquid crystal, the light domain and dark domain are mixedly present to bring about the problem of the breaking-through of light. However, the employment of low-resistivity electrode 12 to which the light-screening function as mentioned above is imparted has settled such a problem. Moreover, even when compared with a conventional connecting method, the effective display area is not decreased.

Low-resistivity electrode 12 used in the present invention should have a film thickness of not less than 0.1 μm, and more preferably from 0.5 μm to 5 μm, in approximation so that it can sufficiently suppress the applied-voltage delay effect previously mentioned when the device is used in the large screen display panel. The surface of low-resistivity electrode 12 can also be applied with a reflection preventive treatment, and thus it is possible to prevent the light reflecting from the spaces between picture elements (i.e., the non-picture element areas ).

When low-resistivity electrode 12 and transparent electrode 11 are electrically connected through the through-hole of insulating film 13, the contact width thereof should also be as large as possible. The width may be about 10 μm in the instance where transparent electrode 11 is wired in a stripe form.

Insulating film 13 can be provided by coating such as spin coating or roll coating, or vacuum deposition, of organic resins such as polyamide, polyimide, polyvinyl alcohol, polyurethane, polycarbonate or silicone resins, or inorganic materials such as $Si_3N_4$, $SiO_2$, SiO, $Al_2O_3$ and $Ta_2O_3$. In a preferred embodiment of the present invention, insulating film 13 having been formed into a film may preferably be leveled to low-resistivity electrode 12. For such purpose, the film thickness of insulating film 13 covered on the substrate 14 on which low-resistivity electrode 12 is absent may be set to be approximately not less than 1.5, and preferably from 2 to 10, times the film thickness of low-resistivity electrode 12, so that the film thickness of insulating film 13 covered on substrate 14 can be leveled over the whole area. Suited as film formation methods usable in that instance is the spin coating or roll coating of organic resins, previously described. On this insulating film 13, a through-hole is also formed which enables electrical connection between transparent electrode 11 on insulating film 13 and low-resistivity electrode 12 below insulating film 13.

The numeral 15 in FIG. 2 denotes an opposed electrode provided on an opposed substrate (not shown), and the part at which this opposed electrode 15 and transparent electrode 11 cross serves as picture element region 10.

Electrode substrate 1 shown in FIG. 1 and FIG. 2 can be provided with an orientation control film, formed into a film, using, for example, inorganic insulating materials such as silicon monoxide, silicon dioxide, aluminum oxide, zirconium oxide, magnesium fluoride, cerium oxide, cerium fluoride, silicon nitride, silicon carbide, and silicon boride, or organic insulating materials such as polyvinyl alcohol, polyimide, polyamidoimide, polyesterimide, polyparaxylylene, polyester, polycarbonate, polyvinyl acetal, polyvinyl chloride, polyamide, polystyrene, cellulose resin, melamine resin, urea resin, and acrylic resin. This orientation control film can also be formed on an additional insulating film of 500 Å to 1 µm thick provided on transparent electrode 11.

This orientation control film can be obtained by rubbing its surface in one direction using velvet, cloth or paper, after the inorganic insulating material or organic insulating material as previously described has been formed into a film.

In another preferred embodiment of the present invention, the orientation control film can be obtained by forming the inorganic material such as SiO or $SiO_2$ into film by oblique vacuum deposition on electrode substrate 1.

The orientation control film described above can be formed with a thickness of usually from 10 Å to 1 82 m. In the instance in which it is directly provided on transparent electrode 11, however, it should be formed with a thickness of from 500 Å to 1 µm, and, in the instance in which it is formed on an insulating film additionally formed on transparent electrode 11, a thickness of approximately from 10 Å to 500 Å.

Figure 3:
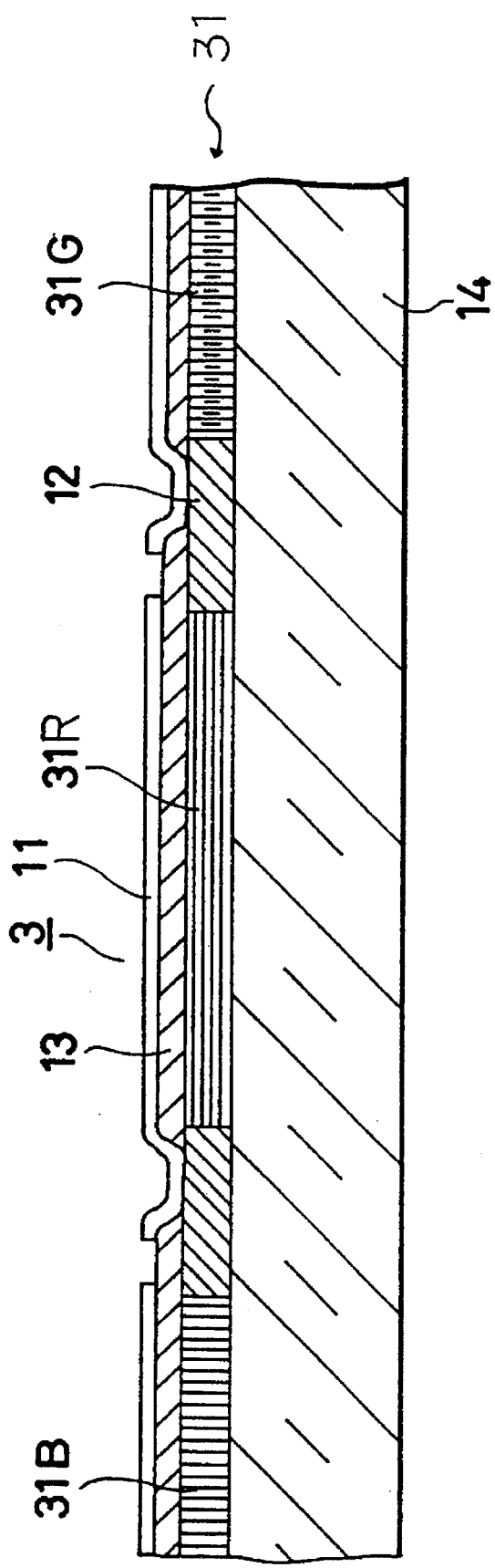
FIG. 3 is a cross section of another electrode substrate used in the present invention.

FIG. 3 is a cross section of color electrode substrate 3 used in the present invention. Color electrode substrate 3 in FIG. 3 comprises blue color filter 31B, red color filter 31R and green color filter 31G provided on substrate 14, and the previously described low-resistivity electrode 12 is disposed between the individual color filters adjacent to each other, of color filter 31. On color filter 31 and low-resistivity electrodes, the insulating film 13 is provided in the same manner as previously described. This insulating film 13, however, can also function as a protective film for color filter 31. Then, like the previously described, low-resistivity electrode 12 is electrically connected to transparent electrode 11 through a through-hole formed in insulating film 13. The orientation control film previously described can also be provided on color electrode substrate 3.

Color filter 31 should be formed with a thickness of from 0.1 µm to 5 µm, and preferably from 0.5 µm to 2 µm, and particularly formed by dispersing a pigment or dye in a resin. Resin materials used on that occasion can be preferably selected from gelatin, casein, glue, polyvinyl alcohol, polyimide, polyamidoimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, epoxy resin, photosensitive polyimide photoresists, photosensitive polyamide photoresists, cyclized rubber photoresists, phenol novolac photoresists, and electron ray photoresists [such as acrylate or methacrylate (monomers, oligomers, prepolymers) and epoxidated 1,4-polybutadiene]. The pigment or dye used on that occasion also includes those of an azo type, an anthraquinone type, a phthalocyanine type, a quinacridone type, an isoindolinone type, a dioxazine type, a perylene type, a perynone type, a thioindigo type, a pyrocholine type, or a quinophthalone type.

Insulating film 13 used in color electrode substrate 3 is required to have together the function as a protective film, and therefore should be selected particularly from films formed by coating such as spin coating or roll coating of organic resins such as polyamide, polyimide, polyurethane, polycarbonate or silicone resins, or inorganic materials such as $Si_3N_4$, $SiO_2$, SiO, $Al_2O_3$ and $Ta_2O_3$.

Figure 4:
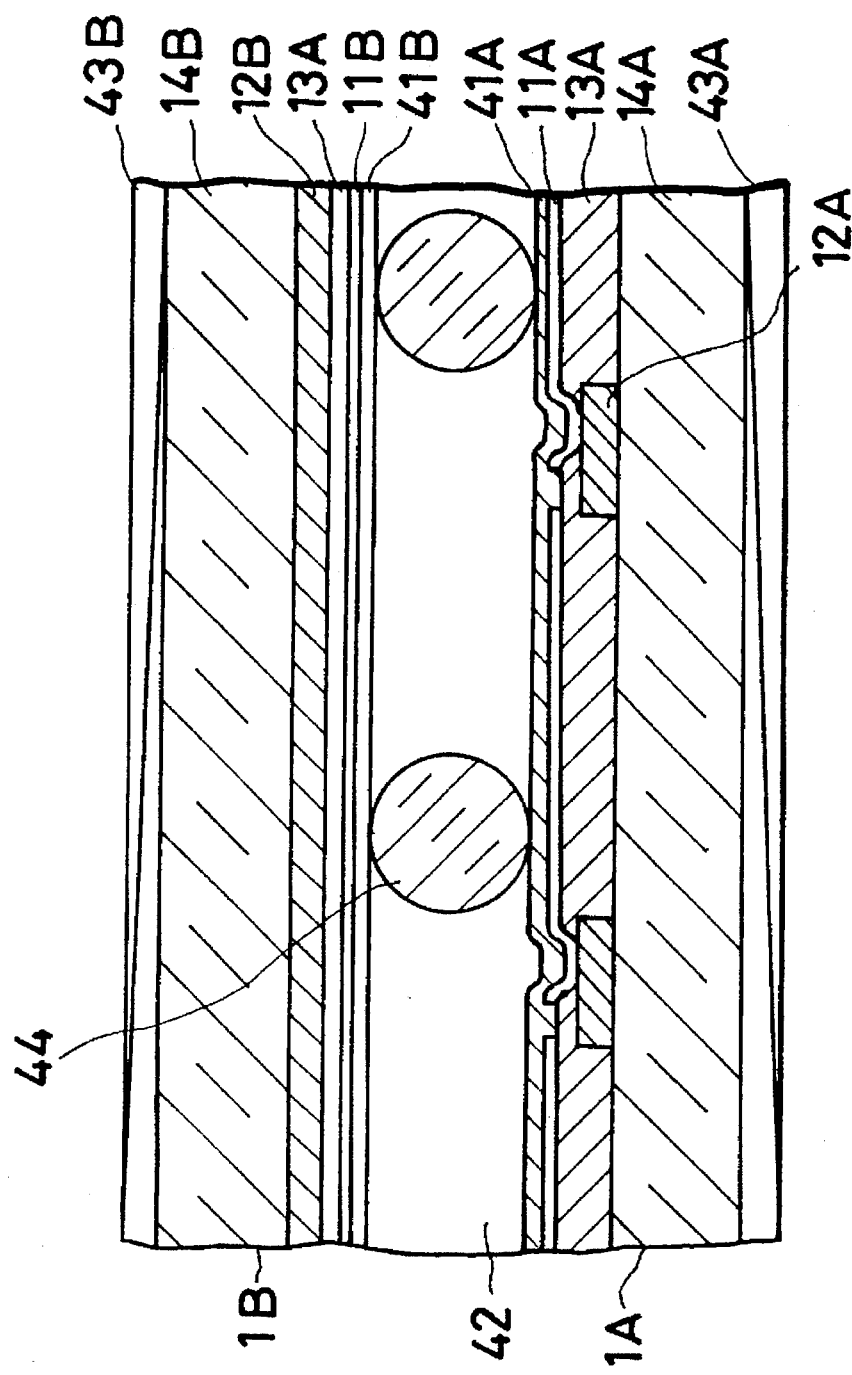
FIG. 4 is a cross section of a liquid crystal device of the present invention.

FIG. 4 is a cross section to show a liquid crystal device of the present invention. The liquid crystal device shown in FIG. 4 comprises surface-stabilized ferroelectric liquid crystal 42 kept in a bistably orientated state, provided between two sheets of electrode substrates 1A and 1B. The space between the two substrates is set with a distance small enough to suppress the spiral arrangement structure of a ferroelectrtc liquid crystal that gives a bistably oriented state of the spiral arrangement structure in a bulky state, e.g., a distance of usually from 0.1 µm to 3 µm. This space with a small distance is kept by spacer material 44 such as silica beads, alumina beads, glass fiber and plastic beads.

The two sheets of electrodes substrate 1A and 1B are, as illustrated in FIG. 4, respectively provided with substrates 14A, and 14B, insulating films 13A and 13B, low-resistivity electrodes 12A and 12B, transparent electrodes 11A and 11B (transparent electrodes 11A and 12B are respectively formed in stripes to give matrix electrodes crossing each other at angles of 90° C.), and orientation control films 41A and 41B. The orienting treatment axes formed on orientation control films 41A and 41B provided on electrode substrates 1A and 1B should preferably be in the direction parallel to each other. The orienting treatment axes used here may be given by monoaxial molecular aligning treatment such as rubbing or oblique vacuum deposition as previously described.

For the purpose of optically detecting the orientation modulation of liquid crystal molecules, polarizers 43A and 43B are disposed on both sides of the two sheets of electrode substrates 1A and respectively, in crossed nicols.

Figure 5:
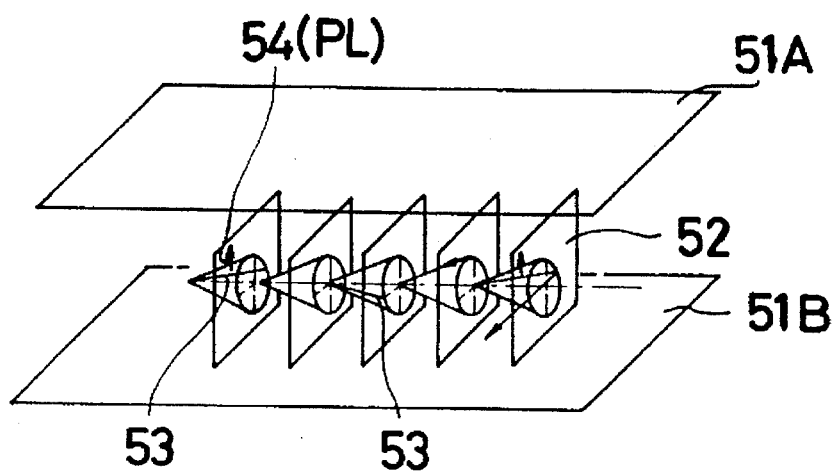
FIG. 5 is a perspective view of a ferroelectric liquid crystal device.

FIG. 5 diagramatically illustrates an example of a cell to describe the operation of a ferroelectric liquid crystal. The numerals 51A and 51B are substrates (glass sheets) each covered with a transparent electrode comprised of a thin film of $In_2O_2$, $SnO_2$, ITO or the like, between which a liquid crystal of an SmC* (chiral smectic phase C) phase or SmH* (chiral smectic H) phase, whose liquid crystal molecular layer 52 is so oriented as to be perpendicular to the glass surface is hermetically sealed. The line shown by a thick line represents a liquid crystal molecule, and this liquid crystal molecule 53 has bipolar moment (P⊥) 54 in the direction crossing at right angles to its molecule. Applying between substrates 51A and 51B a voltage of not lower than a given threshold value makes loose the spiral structure of liquid crystal molecule 53, and thus the orientation direction of liquid crystal molecule 53 can be changed so that all bipolar moments (P⊥) 54 may face the direction of the electric field. Liquid crystal molecule 53 is long and slender in its shape, and shows the refractive index anisotropy in its major axis direction and minor axis direction. Thus, it can be readily understood that, if, for example, polarizers each other arranged in crossed nicols are placed above and below the glass surface, there is given a liquid crystal optical modulation device that changes its optical properties depending on the polarity in voltage application.

Figure 6:
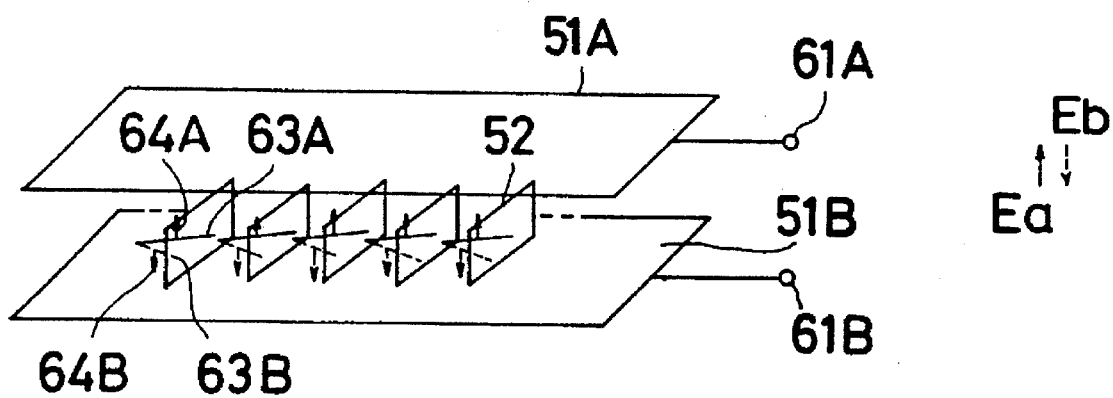
FIG. 6 is a perspective view of a surface-stablized ferroelectric liquid crystal device in a bistably oriented state.

The surface-stabilized ferroelectric liquid crystal cell kept in the bistably oriented state, preferably used in the optical modulation device of the present invention, can be made to have a sufficiently small thickness (for example, of from 0.1 μm to 3 μm). As the thickness of a liquid crystal layer becomes small like this, the spiral structure of the liquid crystal molecues becomes loose even in the state in which no electric field is applied, and they turn to have a non-spiral structure as illustrated in FIG. 6, where its bipolar moment P or P' takes the state of either upward direction (64A) or downward direction (64B). When such a cell is applied with electric field Ea or Eb having different polarity and of not lower than a given threshold value as shown in FIG. 6, using voltage applying means 61A and 61B, the bipolar moment changes its direction upward 64A or downward 64B corresponding to the electric field vector of electric field Ea or Eb, and, in accordance with it, the liquid crystal molecules orient to any one of first stable state 63A or second stable state 63B.

The effect obtainable by this ferroelectric liquid crystal cell is, in the first place, that it shows a very high response speed, and, in the second place, that the alignment of liquid crystal molecules are bistable. To further detail the second point with reference to FIG. 6, the application of the electric field Ea results in the alignment of liquid crystal molecules in first stable state 63A, which state, however, is stable even after the electric field has been turned off. The application of the reverse electric field Eb also results in the alignment of liquid crystal molecules in second state 63B with the change of the molecular direction, which state, however, is also kept even after the electric field has been turned off. The respective oriented state are also maintained so long as the electric field Ea applied does not exceed a given threshold value.

The ferroelectric liquid crystal used in the present invention may include various types, but may preferably be a chiral smectic liquid crystal commonly having the temperature range that can produce the cholesteric phase and smectic A phase in the course the temperature is lowered. Stated specifically, "CS-1011", "CS-1014", "CS-1017", "CS-1018" (all trade names for Chisso Corporation), etc. are used.

The method of forming the color filter according to the present invention is a method in which, using a light-screening layer as the main mask, the back side of a substrate, having been roughly aligned with a photomask (rough mask), is subjected to the back-side exposure to bring the desired area of a photosensitive colored layer into photocure, thus forming a film insoluble to a developing solution, followed by removal of an unexposed area as a result of developing, to obtain a colored pattern. Description will be specifically made below with reference to FIG. 7 (7A to 7J).

Figure 7A:
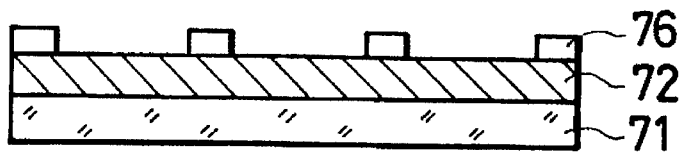
FIGS. 7 (7A to 7J) to 11 (11A to 11G) cross-sectionally illustrate processes of forming the color filter of the present invention.
Figure 7B:
Figure 7C:
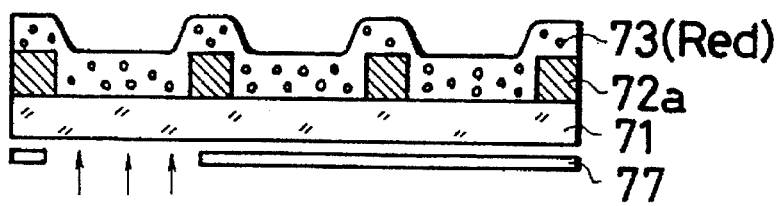

As shown in FIG. 7A, light-screening film 72 is provided on substrate 71, and then a pattern is formed using photoresist 76. Here, substrate 71 must be a substrate made of glass or the like, capable of transmitting light of from 300 nm to 400 nm. The light-screening film denoted as 72 may preferably be a film having a transmittance of not more than 2% at 300 nm to 800 nm. Next, the insoluble area of the light-screening film is removed by etching and thereafter the photoresist is also removed. Used as a means for removing this light-screening film is wet etching, dry etching, or the like. In the case when the light-screening film is formed by vacuum deposition, lifting-off is also an effective means. As a result, light-screening film pattern 72a as shown in FIG. 7B is obtained. Then, the whole surface is coated with photosensitive colored resin 73 (red) as shown in FIG. 7C. A base resin material for the photosensitive colored resin includes gelatin, casein, glue, polyvinyl alcohol, polyimide, polyamidoimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, and epoxy resin. A pigment or dye mixed in the resin includes those of an azo type, an anthraquinone type, a phthalocyanine type, a quinacridone type, an isoindolinone type, a dioxazine type, a perylene type, a perynone type, a thioindigo type, a pyrocholine type, or a quinophthalone type.

Figure 7D:
Figure 7E:
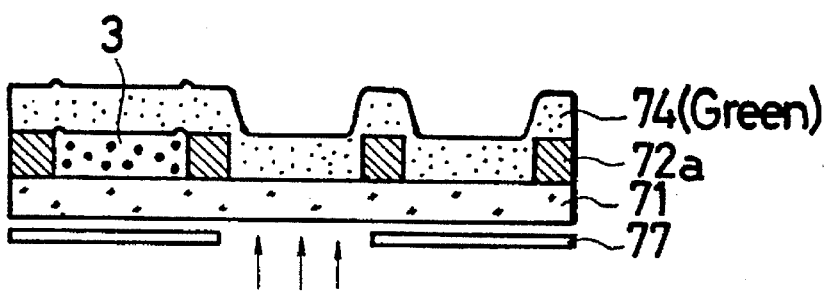
Figure 7F:
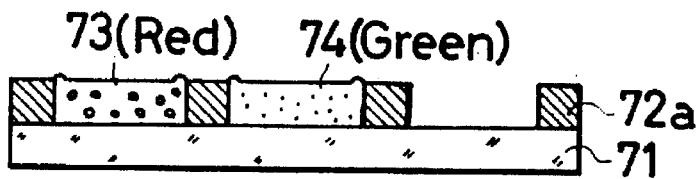
Figure 7G:
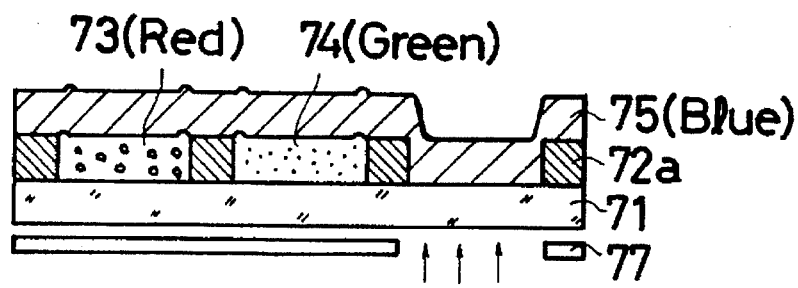
Figure 7H:
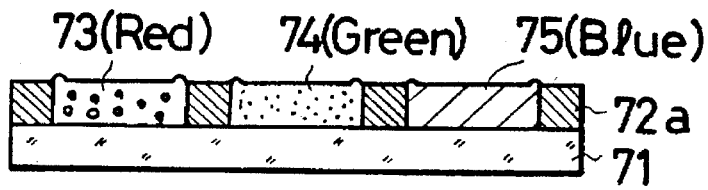
Figure 7I:
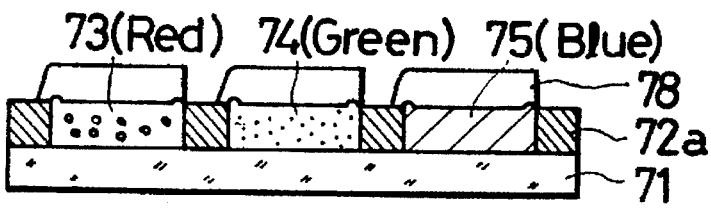
Figure 7J:
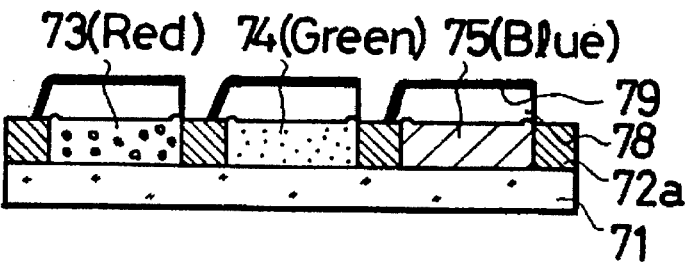

Then, in order to expose only the desired area to light, photomask 77 is aligned on the back side of substrate 71, and thus exposure is carried out from the back side. As a result, the desired area only is photo-cured to turn insoluble to a developing solution. Photomask 77 used here has less influence on the precision of the filter pattern even if it is aligned with some deviation. This is because edge areas are precisely exposed to light by virtue of light-screening film pattern 72a. Then, the unexposed area is dissolved and removed as a result of developing, and thus a colored pattern of a first color is obtained as shown in FIG. 73D. A second color pattern and a third color pattern are also similarly formed to obtain a color filter of three colors as shown in FIG. 7H. If necessary, a passivation layer 78 as shown in FIG. 7I is further provided. In particular, In the instance of a liquid crystal color display panel, it is also effective for driving a liquid crystal device to form light-screening film pattern 72a with a metal (as exemplified by aluminum), and connecting it with ITO on passivation layer 78 to lower the resistivity.

Thus, it has become possible to form a color filter having no gap between the filter and light-screening film and also being free of the faulting (difference in level) due to the overlapping between the light-screening film and filter.

EXAMPLE 1

Color Filter for Liquid Crystal Display

An example according to the present invention will be described with reference to FIG. 7 (7A to 7J).

As shown in FIG. 7A, aluminum is provided by sputtering with a film thickness of 1.5 μm on glass substrate 71, and thereafter a pattern for making stripes of 100 μm wide is formed using a positive resist (HPR-1182; a product of Fuji-Hunt Electronics Technology Co.). Then the aluminum at the area not protected by the resist is removed using an aluminum etching solution, thereby forming colored layer openings as shown in FIG. 7B. Thereafter the resist layer is removed using acetone. Then, as shown in FIG. 7C, red colored layer (continuous film) 73(Red) of 1.5 μm thick is formed on the whole surface by spin coating of a dispersion comprising a red pigment dispersed in a photosensitive polyamide resin, followed by pre-baking at 90° C. for 30 minutes. Thereafter, the back side of a glass substrate is aligned with a photomask, and the back-side exposure is carried out using an energy of 3,000 mJ/cm$^2$ to bring the photosensitive colored resin on the glass surface between aluminum light-screening films 72a into photocure, thus forming a film insoluble to a developing solution. Then the unexposed area is dissolved and removed using a developing solution exclusively used therefor, followed by post-baking at 200° C. for 30 minutes. Red colored layer 73(Red) as shown in FIG. 7D is thus obtained. Green colored layer 74(Green) and blue colored layer 75(Blue) are also similarly formed (FIG. 7H). Then, as shown in FIG. 7I, passivation layer 78 is formed (using PI-300; a product of Ube Industries, Ltd.) with a thickness of 1.5 µm on the colored layer, and thereafter ITO (indium-tin oxide) is provided thereon by sputtering with a thickness of 2,000 Å, followed by patterning according to photolithoetching. Resulting ITO film 79 is in contact with the aluminum serving as light-screening film 72a. This contact of aluminum with ITO brings about a lowering of the resistivity of the electrode.

EXAMPLE 2

Color Filter for Image Pickup Device

Another example will be described with reference to FIG. 8 (8A to 8E).

Figure 8A:
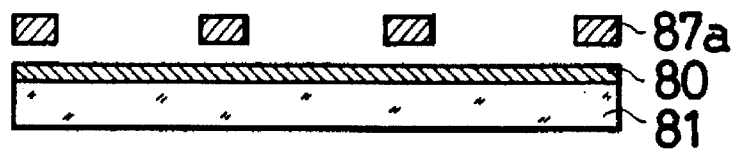
Figure 8B:
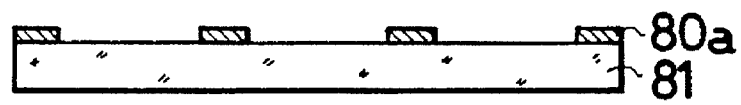
Figure 8C:
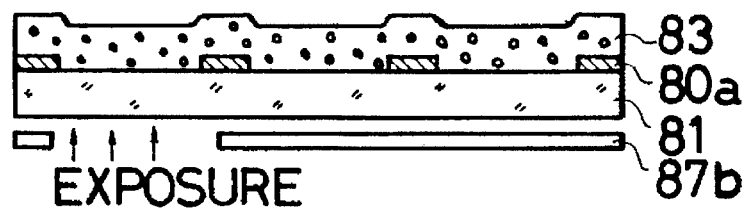
Figure 8D:
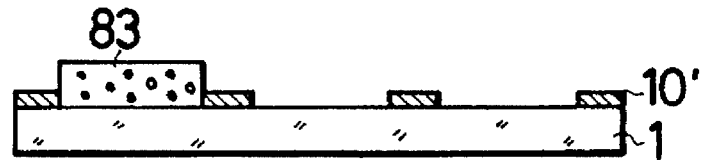

As shown in FIG. 8A, colored film 80 (available from Fuji-Hunt Electronics Technology Co.; a color mosaic system, black) is provided by spin coating on glass substrate 81, followed by pre-baking at 100° C. for 15 minutes. Thereafter, using photomask 87a, the film is exposed to light at an energy of 40 mJ/cm$^2$ using ultraviolet rays, thus forming a film soluble to a developing solution. Then the exposed area is dissolved and removed using a developing solution exclusively used therefor to form light-screening film pattern 80a as shown in FIG. 8B. Post-baking is then carried out at 180° C. for 30 minutes, and thereafter coating 83, a first color, comprising a red pigment dispersed in a photosensitive polyamide resin is formed on the whole surface by spin Thereafter, pre-baking is carried out at 90° C. for 30 minutes, and then the back side of the substrate aligned with photomask 87b to make back-side exposure at an energy of 3,000 mJ/cm$^2$ using ultraviolet rays. As a result, the desired area of red colored layer 83 is photo-cured to turn insoluble to a developing solution. Then the unexposed area is dissolved and removed using a developing solution exclusively used therefor, followed by post-baking at 200° C. for 30 minutes to form red colored layer 83 as shown in FIG. 8D. Green and blue colored layers are similarly formed by repeating the procedure shown in FIGS. 8C and 8D. The colored layers each have a film thickness of 1.7 µm (red, 83), 1.5 µm (green, 84) and 1.9 µm (blue, 85).

Figure 8E:
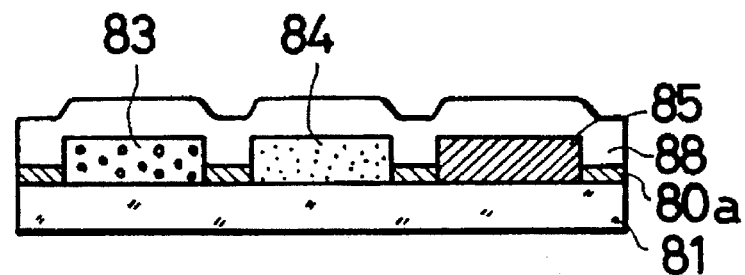

Then passivation layer 88 is finally formed (using PI-300; a product of Ube Industries, Ltd.) with a thickness of 1.0 µm. A color filter for an image pickup device as shown in FIG. 8E is thus formed.

As described in the above, since the colored layer is formed using the light-screening layer as the first mask and the photomask as the second mask, the light-screening layer and colored layer can be precisely formed without any gap. Thus, in the case of liquid crystal display panels, no lowering of contrast occurs, which is due to blank areas, resulting in an improvement in the contrast. In the case of image pickup devices also, no flare phenomenon is caused, and hence a sharp image can be obtained.

The exposure is carried out from the back side of the substrate, so that the adhesion at the interface between the substrate and colored layer is improved to make the process stable and at the same time improve the yield.

Particularly in the the case of liquid crystal display panels, the light-screening film or layer is used as a mask. Hence, no faulting (difference in level) is caused, which has been hitherto caused by the overlapping of the light-screening layer and colored layer because of the alignment deviation, so that a uniform cell gap can be obtained. When the stripe pattern is formed using a metal, on the light-screening layer, the wiring resistance can be lowered as a result of its connection with the ITO layer formed later, so that it becomes possible to lessen the heat generation on the panel or the waveform dullness.

Thus, the formation of the color filter, using the light-screening film or layer as the mask and according to the back-side exposure can bring about a good effect from the viewpoints of the stableness on the process and the color reproducibility.

Another embodiment of the present invention is in the first place characterized by a color filter comprising an aggregate of color microfilters arranged in parallel on a substrate, wherein a light-screening area set to have a thickness not more than twice the film thickness of said color microfilters is provided between said color microfilters. In the second place, the color filter can be prepared by a method comprising;

a first step of forming on a substrate a first opaque film having been subjected to patterning to a first pattern form;

a second step of providing a first photosensitive colored resin film on the substrate having said first opaque film;

a third step of subjecting the first photosensitive colored resin film formed in said second step, to exposure from the back side of the substrate, and removing the first photosensitive colored resin film formed on the first opaque film;

a fourth step of forming a second opaque film having been subjected to patterning to a second pattern form, on the substrate having the first colored resin film having been subjected to patterning in said third step and the first opaque film;

a fifth step of forming a second photosensitive colored resin film on the substrate having said second opaque film; and a sixth step of subjecting the second photosensitive colored resin film formed in said fifth step, to exposure from the back side of the substrate, and removing the second photosensitive colored resin film formed on the second opaque film.

First, in FIG. 9A, opaque film 92A that serves later as light-screening film 92 is formed on a glass plate, substrate 91 of the color filter. Light-screening film 92 or opaque film 92A may be comprised of any metal or alloy, or colored resin, so long as it has the performance of intercepting light, but may preferably be a low-resistivity film made of a metal or alloy. Next, opaque film 92A at position 93A at which a first color (red color) area corresponding to color microfilter 93 is formed is removed by a photolithoetching technique, so that glass surface 93B at red area forming position 93A having been subjected to patterning can be uncovered to the outside. In FIG. 9B, negative photosensitive colored resin film 93C (red color) which is a material of red microfilter 93 is provided on the whole surface by spin coating, followed by pre-baking. Then, exposure to ultraviolet light is carried out from the back side of substrate 91, so that red photosensitive colored resin film 93C is exposed to light only at red area forming position 93A, and proceeds to cure by photo-crosslinking, turning insoluble to a developing solution. Thereafter, red photosensitive colored resin film 93C on opaque film 92A not having been photo-crosslinked is removed using a developing solution exclusively used therefor, followed by post-baking, thus obtaining a fist color, red microfilter 93 as shown in FIG. 9C.

Figure 9A:
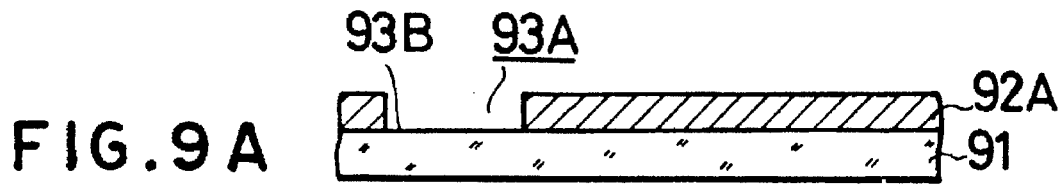
Figure 9B:
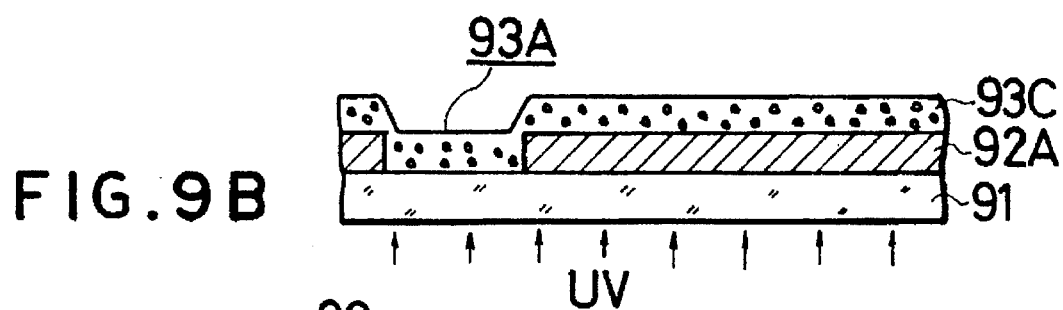
Figure 9C:
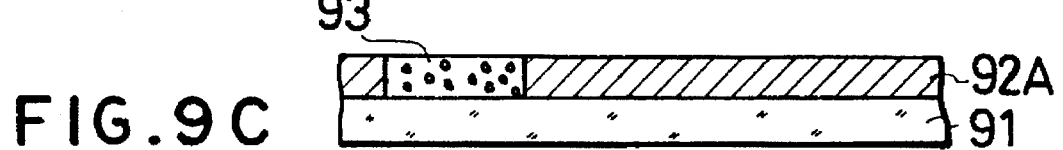
Figure 9D:
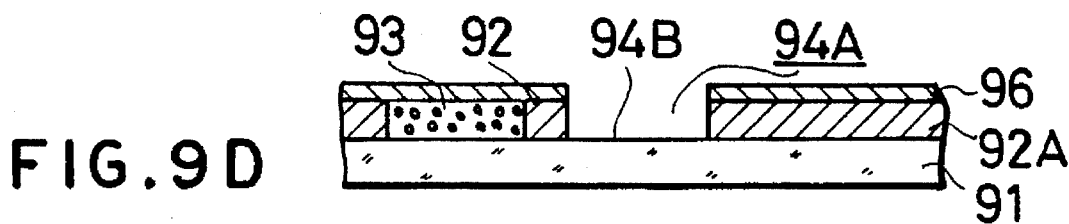
Figure 9E:
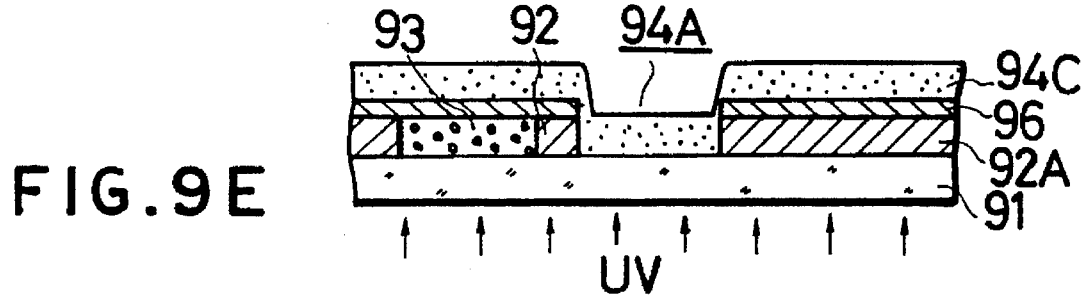
Figure 9F:
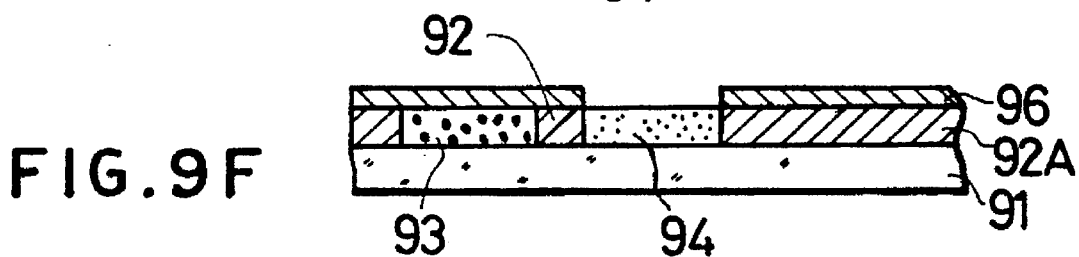
Figure 9G:
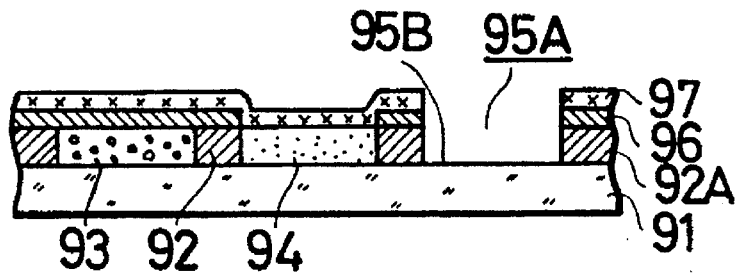
Figure 9H:
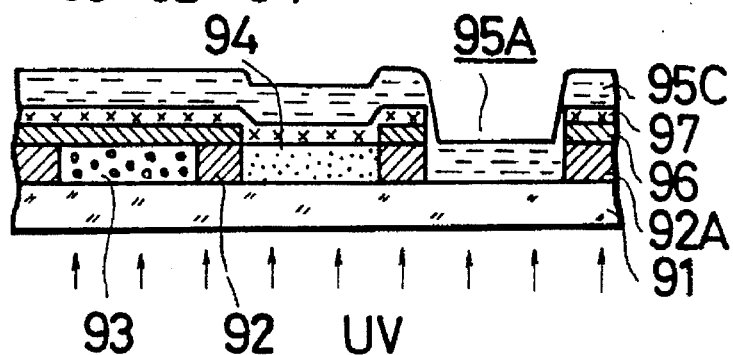
Figure 9I:
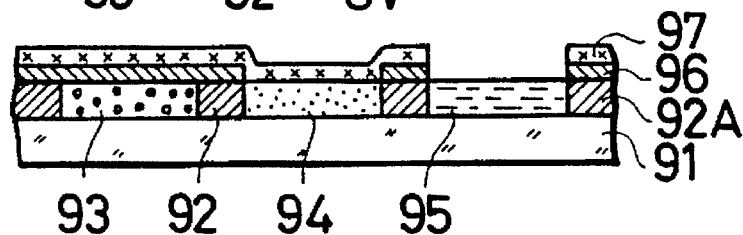

Next, a second color, green microfilter 94 is formed, where, however, an opaque film 96 must be formed as shown in FIG. 9D, using a material different from opaque film 92 initially used, in order that the second color area may not be formed on the first color (red color) area. Accordingly, after second opaque film 96 has been newly provided on the whole surface, second opaque film 96 formed at the second color, green area forming position 94A is removed by photolithoetching like the case of the first color area, so that glass surface 94B is uncovered to the outside. In FIG. 9E, green photosensitive colored resin film 94C is provided by coating on the whole surface, and baked. Thereafter, exposure to ultraviolet light is carried out from the back side of substrate 91, followed by developing, and then post-baking. A second color, green microfilter 94 is thus formed as shown in FIG. 9F. A third color, blue microfilter 95 is obtained in the same manner as the case of the second color area. Namely, in FIG. 9G, opaque film 97 is provided in the manner that the blue area forming position 95A is formed by patterning and glass surface 95B is uncovered to the outside, and thereafter blue photosensitive colored resin film 95C as shown in FIG. 9H is provided by coating, and baked. Thereafter, exposure using ultraviolet light is carried out from the back side of substrate 91, followed by developing, and then post-baking. The third color, blue microfilter 95 is thus formed as shown in FIG. 9I.

Figure 9J:
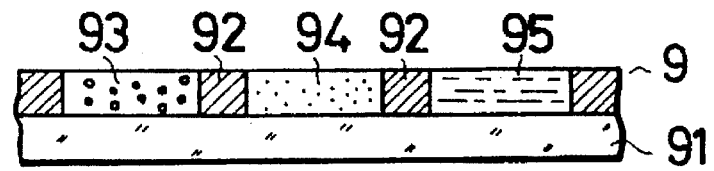

Subsequently, as shown in FIG. 9J, opaque films 96 and 97 is dissolved and removed, so that color filter 9 can be obtained in which an aggregate of respective red microfilter 93, green microfilter 94 and blue microfilter 95 is arranged.

Figure 9K:
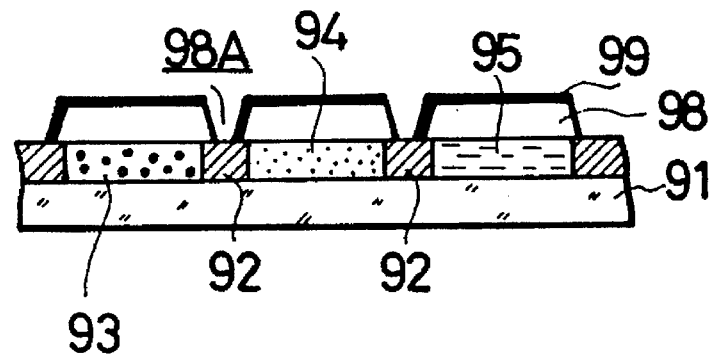

In the present invention, as shown in FIG. 9K, transparent insulating film 98, which is a transparent resin film (comprising polyamide, polyester or polyolefin), is further formed on color filter 9, and contact hole 98A is formed on light-screening film 92 of this transparent insulating film 98 (here is used a film formed with a low-resistivity opaque film made of a metal, an alloy or the like) so that light-screening film 92 may be electrically connected with transparent conductive film (made of, for example, $SnO_2$, $In_2O_3$, or indium-tin oxide) 99 serving as a transparent electrode, provided on transparent insulating (passivation) film 98. FIG. 10 (10A to 10G) illustrates another preferred embodiment of the present invention. The process shown in FIG. 10 is embodied by omitting opaque films 96 and 97 used in the process of FIG. 9, and imparting the functions shared by them to the color microfilters. Hence, the color microfilters used in the present Example must be substantially opaque to the light of the photosensitive wavelength region of the photosensitive colored resin film.

Figure 10A:
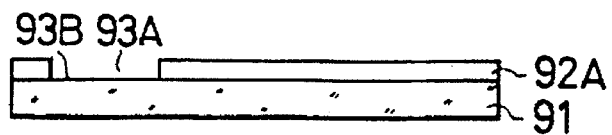
Figure 10B:
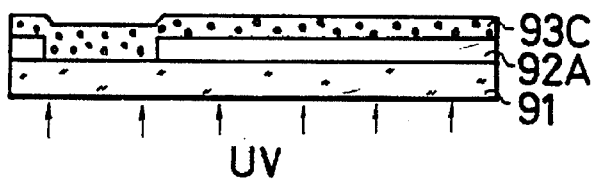
Figure 10C:
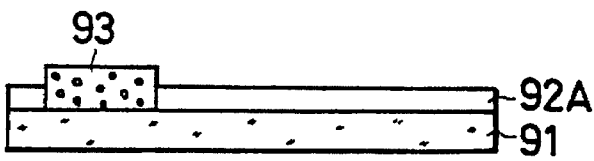
Figure 10D:
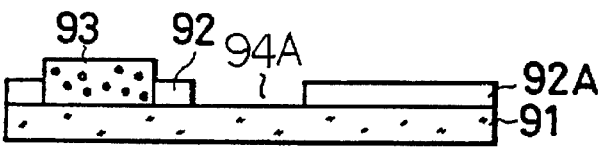
Figure 10E:
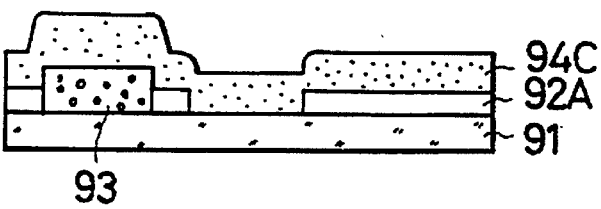
Figure 10F:
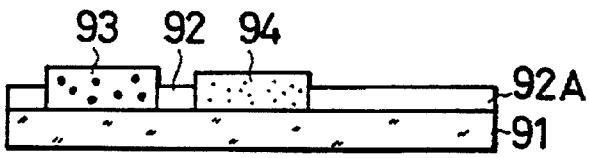
Figure 10G:
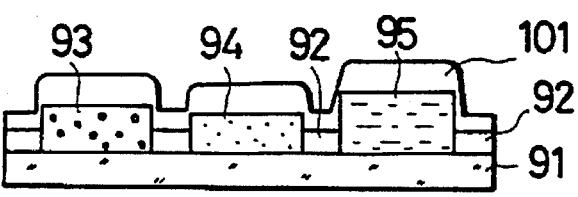

FIGS. 10A, 10B and 10C show the same steps as those in FIGS. 9A, 9B and 9C (in this instance, red photosensitive resin film 93C is made to have a larger thickness than the film thickness of the opaque film 92A). Next, the green area forming position 94A as shown in FIG. 10D is formed by patterning, on which green photosensitive resin film 94C as shown in FIG. 10E is provided by coating. This green photosensitive resin film 94C is exposed to light from the back side of substrate 91, and has no substantial sensitivity to ultraviolet light passed through red microfilter 93. Hence, after the exposure is carried out using ultraviolet light as shown in FIG. 10E followed by developing, green microfilter 94 as shown in FIG. 10F is formed. Subsequently, a similar step may be followed to form blue microfilter 95 as shown in FIG. 10G. Transparent passivation film 101 is further provided thereon by coating. In the present Example, it is preferred that the color microfilters are formed in the order of a green microfilter, a blue microfilter, and a red microfilter, and, as to the film thickness in forming these, the red microfilter is made to have the largest film thickness and the blue microfilter the smallest film thickness.

The photosensitive resin used in the present invention may preferably include photosensitive polyamides, photosensitive polyimides, cyclized rubber photoresists, and phenol novolac photoresists. In this photosensitive resin, a pigment or dye of an azo type, an anthraquinone type, a phthalocyanine type, a quinacridone type, an isoindolinone type, a dioxazine type, a perylene type, a perynone type, a thioindigo type, a pyrocholine type, or a quinophthalone type may be dispersingly contained, so that there can be obtained a photosensitive resin colored into red, green or blue. The above color microfilters should be made to have a film thickness of from 0.1 μm to 5 μm, and preferably from 0.5 to 2 μm. In setting this film thickness, the color microfilters should be made to have a film thickness of not more than twice preferably from 0.5 time to 1.5 times, and more preferably from 0.8 time to 1.2 times the film thickness of the light-screening film 92. A film thickness of the color microfilter, more than twice that of light-screening film 92 may enable no sure masking at opaque film 92A serving as a mask, when exposure to ultraviolet light is carried out from the back side of substrate 91.

EXAMPLE 3

Preparation of Color Filter for Liquid Crystal Display Panel

The method of forming the color filter for a liquid crystal display panel according to the present invention will be described with reference to FIG. 9.

On glass substrate 91, an aluminum film serving as light-screening film 92 was formed by sputtering so as to have a film thickness of 1.5 μm. Thereafter, a pattern for making stripes of 100 μm wide and pitch was formed using a resist, and then the aluminum film was etched so that glass surface 93B at red area forming position 93A as shown in FIG. 9A was uncovered. Thereafter, a dispersion comprising a red pigment dispersed in a photosensitive polyamide resin PA-1000 (a product of Ube Industries, Ltd.), which is a material of the first color area, was applied on the whole surface by spin coating so as to give a film thickness of 1.5 μm, followed by pre-baking (80° C., 30 minutes). Then, the whole areal exposure (3,000 mJ/cm$^2$) was carried out using ultraviolet rays, from the back side of substrate 91 to cure only the colored resin on the glass surface to bring it into a state insoluble to a developing solution. The colored resin on the aluminum film, corresponding to the unexposed area, was removed using a developing solution exclusively used therefor, and rinsed with a rinsing solution exclusively used therefor, followed by post-baking (200° C., 60 minutes) to form an aggregate of red microfilter 93 as shown in FIG. 9C. Next, to form a second color, green microfilter 94, a chromium film was provided by sputtering with a film thickness of 1,000 Å as opaque film 96 on the whole surface for the purpose of preventing green microfilter 94 from being formed on red microfilter 93 first formed. Thereafter, the chromium film and aluminum film on green area forming position 94A were subjected to patterning using a resist, and then removed by etching to uncover glass surface 94B. Here, green area forming position 94A was distant by 5 μm from the end of red microfilter 93, with a pattern width of 100 μm like that of the red microfilter 91 (FIG. 9D). Thereafter, a dispersion comprising a green pigment dispersed in photosensitive polyamide resin PA-1000 (a product of Ube Industries, Ltd.) was applied on the whole surface by spin coating so as to give a film thickness of 1.5 μm, followed by pre-baking (80° C., 30 minutes). Then, the whole areal exposure was carried out at 5,000 mJ/cm² using ultraviolet light, from the back side of substrate 91 to cure only the green colored resin on the glass surface to bring it into a state insoluble to a developing solution (FIG. 9E). The green colored resin on the chromium film, corresponding to the unexposed area, was removed using a developing solution exclusively used therefor, and rinsed with a rinsing solution exclusively used therefor, followed by post-baking (200° C., 60 minutes) to form green microfilter 94 as shown in FIG. 9F. Then, as shown in FIG. 9G, a chromium film was formed so that a third color (blue color) area may not be formed on green microfilter 94, and the chromium film and aluminum film at third color area forming position 95A were removed in the same manner as the formation of the second color area. Then, a dispersion comprising a blue pigment dispersed in photosensitive polyamide resin PA-1000 (a product of Ube Industries, Ltd.) was applied on the whole surface by spin coating, followed by pre-baking (80° C., 30 minutes). Then, the whole areal exposure was carried out using ultraviolet light, from the back side of substrate 91 (FIG. 9H), followed by developing, rinsing, and post-baking to form a blue microfilter 95 (FIG. 9I). Thereafter, the chromium film was etched to remove it from the whole surface. As passivation, a photosensitive polyimide resin (PI-300; a product of Ube Industries, Ltd.) was then applied on the whole surface by spin coating, followed by pre-baking (140° C., 60 minutes). Thereafter, using a photomask for the formation of contact hole 98A, only the top of the color filters was exposed to ultraviolet light to effect curing. Then, the uncured area was removed using a developing solution exclusively used therefor, followed by rinsing treatment using a rinsing solution exclusively used therefor, and then post-baking (250° C., 60 minutes) to form passivation film 98. Finally, a transparent conductive film (ITO, indium-tin oxide) was formed by sputtering with a film thickness of 1,000 Å, and thereafter brought into contact with the aluminum film as shown in FIG. 9K by photolithoetching, thus obtaining a low-resistivity wiring.

According to the Example described above, there was formed a color filter having no gap between the light-screening layer and filter layer, and having a low-resistivity electrode.

EXAMPLE 4

Preparation of Laminated Color Filter for Image Pickup Device

Another Example of the present invention will be described with reference to FIG. 10. This Example is a color filter for an image pickup device, and also a method in which the filter itself is utilized as a mask used when a next color area is formed, on account of the spectral characteristics of the color filter.

On glass substrate 91, a chromium film as opaque film 92A was formed by sputtering with a thickness of 1,000 Å, and thereafter the chromium film at the position at which a first color (green color) area is formed was removed by photolithoetching (pattern size: 30 μm²) (FIG. 10A). Thereafter, a dispersion comprising a green pigment dispersed in photosensitive polyamide resin PA-1000 (a product of Ube Industries, Ltd.) was applied on the whole surface by spin coating with a film thickness of 1.7 μm, followed by pre-baking (80° C., 30 minutes). Then, exposure (5,000 mJ/cm²) was carried out using ultraviolet rays, from the back side of the glass substrate 91 to cure the colored resin on the glass surface to bring it into a state insoluble to a developing solution. Thereafter, the colored layer on the chromium film was removed using a developing solution exclusively used therefor, and rinsed with a rinsing solution exclusively used therefor, followed by post-baking (200° C., 60 minutes) to form a green microfilter as shown in FIG. 10C. As to the spectral characteristics of this green microfilter, the transmittance was 1% at 320 nm to 380 nm at which the polyamide resin has a sensitivity. In the formation of the next second color area also, photolithoetching was carried out in the same manner as in the formation of the first color area to remove the chromium film at the second color (blue color) area forming position as shown in FIG. 10D. Thereafter, a dispersion comprising a blue pigment dispersed in photosensitive polyamide resin PA-1000 (a product of Ube Industries, Ltd.) was applied with a film thickness of 1.8 μm, followed by pre-baking (80° C., 30 minutes). Then, ultraviolet exposure was carried out at 3,000 mJ/cm² from the glass substrate side to cure the blue colored resin film on the glass surface, followed by developing, rinsing, and post-baking (200° C., 60 minutes). A blue microfilter was thus formed. Here, since the blue color area on the green microfilter was not cured, it was removed as a result of the developing. As to the spectral characteristics of the blue color area, the transmittance was also 1% at 320 nm to 380 nm like the case of the green color area. The next third color (red color) area was also similarly formed. The resulting red microfilter was formed with a film thickness of 1.6 μm (amount of exposure: 3,000 mJ/cm²; prebaking: 80° C., 30 minutes; post-baking: 200° C., 60 minutes). Then, using a photosensitive polyamide resin (a produce of Ube Industries, Ltd.), a passivation film was finally formed with a film thickness of 1 μm (FIG. 10G).

The color filter obtained in this way had no gap between the light-screening layer and colored layer, and was able to be formed with ease.

As described in the above, since, according to the present invention, the colored film is formed using the light-screening film as a mask, the light-screening film and colored film can be precisely formed without any gap. Thus, in the case of display panels, no blank areas are formed, resulting in an improvement in the contrast. In the case of image pickup devices also, no flare phenomenon is caused, and hence a sharp image can be obtained.

The exposure is carried out from the back side, so that the adhesion between the substrate and colored layer is improved to make the process stable and at the same time improve the yield.

The light-screening film or layer is used as a mask. Hence, no faulting (difference in level) is caused, since there is no overlapping of the colored film and light-screening film, so that a uniform cell gap can be obtained. Since the metal or alloy is used in the light-screening film, the wiring resistance can be lowered as a result of its connection with the ITO film, so that it becomes possible to lessen the heat generation on the panel or the waveform dullness.

Thus, the formation of the color filter according to the back-side exposure can bring about a good effect from the viewpoints of the stableness on the process, as well as the quality level and color reproducibility.

In another embodiment, the present invention is a method of preparing a color filter having a non-light-transmissive metallic film closely disposed between color filter picture elements of respective colors on a substrate. The steps that can be used therein comprise;

a step of forming on a substrate a plural color of colored resin patterns comprising a colored material incorporated in a resin;

a step of providing a photoresist film by coating on the surface of the substrate on which the plural color of colored resin patterns have been formed, and carrying out exposure from the back side of the substrate, followed by developing to remove the exposed area other than the colored resin patterns;

a step of forming a non-light-transmissive metallic film on the substrate on which the plural color of colored resin patterns thus obtained and the photoresist film patterns provided on their tops have been formed; and a step of dissolving only said photoresist film patterns to lift off the metallic film formed on the tops of the plural color of colored resin patterns.

According to the above constitution, the colored resin pattern area serving as the color filter picture element is utilized as a photomask when the resist pattern for the lifting-off is formed, so that the resist pattern can be formed in the form well aligned with the color filter picture element, which gives a self-aligned form when the metallic film pattern is formed. Hence, the non-light-transmissive metallic film can be closely provided between the color filter picture elements of respective colors according to a simple procedure. In the instance of image pickup devices or sensor devices that employ such a color filter, an improvement in color reproducibility can be expected, and also the satisfactory light-screening leads to the prevention of misoperation of an optical device. In the instance of liquid crystal display devices, an improvement in contrast and color purity can be expected, and also it becomes possible to make them have together a function as an electrode auxiliary wire. In addition, the wiring of picture element electrodes can be made with low resistivity. This is effective for preventing signal delay in large screen display and also preventing display quality level from being lowered because of the heat generation in the cell.

Moreover, when compared with conventional ones, the device can take a superior color filter structure with more flatness. Thus, in the type the color filter is built in a liquid crystal display, a device suffering less defective orientation and having a superior display quality level can be obtained.

FIGS. 11A to 11G constitute a flow sheet to illustrate a typical embodiment of a process for preparing the color filter according to the present invention.

Figure 11A:
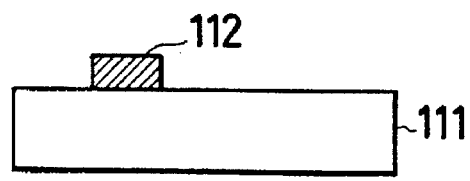
Figure 11B:
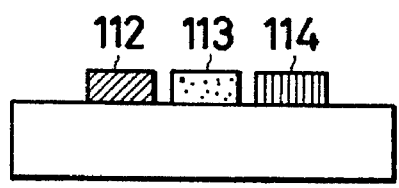

First, as shown in FIG. 11A, colored resin pattern 112 having a given film thickness and a given pattern form is formed on substrate 111, using a first colored resin solution comprising a coloring material dispersed in a resin.

In instances in which a photosensitive resin is used as the resin, the first colored resin solution is first applied with a given film thickness on substrate 111, followed by each treatment of prebaking, exposure, developing, rinsing, and post-baking, to obtain colored resin pattern 112 having a given pattern form. In instances in which a resin having no photosensitivity is used, a colored resin pattern having a given film thickness and a given pattern form is obtained by printing. Alternatively, a method can be employed in which the first colored resin solution is applied with a given film thickness on substrate 111, and thereafter a photoresist pattern is formed on the resulting colored resin film, followed by etching to obtain colored resin pattern 112 having a given pattern form.

In instances in which a color filter comprised of two or more colors is formed, any of the above methods may be further repeated depending on what are required, i.e., depending on the number of the colors of filters, respectively using colored resin solutions containing coloring materials corresponding to the respective colors. Thus, it is possible to form a color filter picture element comprised of three-color colored resin patterns 112, 113, 114 as shown, for example, in FIG. 11B.

Figure 11C:
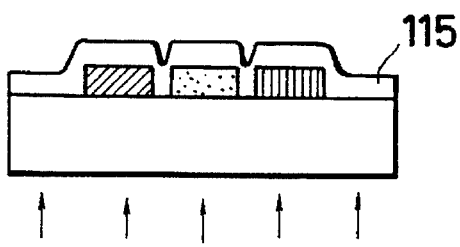

Next, on the color filter substrate thus formed, a positive photoresist is applied with a given film thickness as shown in FIG. 11C, followed by pre-baking. Then, exposure is carried out from the back side of the substrate, using light that affects the resulting photoresist film 115 (e.g., a high pressure mercury lamp), where photoresist film 115 is brought into photodecomposition only at the part thereof formed on the glass to make it into a form soluble to a developing solution. Because of the coloring materials having an absorption at the ultraviolet region which are contained in respective colored resin patterns 112, 113 and 114 already formed, and also because of the color characteristics of the color filter, the transmittance at the ultraviolet region is very low.

Hence, it is possible to utilize these colored resin patterns 112, 113 and 114 as photomasks. Since, however, these colored resin patterns 112, 113 and 114 have different transmission characteristics at the ultraviolet region to which the photoresist has a sensitivity, depending on the required color characteristics of the color filter, conditions are previously so set that the light irradiated in the exposure may be in a sufficiently attenuated form at the interface between colored resin patterns 112, 113 and 114 and the photoresist 115.

Figure 11D:
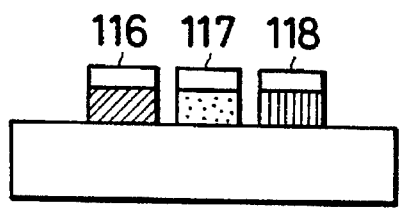

Photoresist film 115 exposed to light under the conditions set in this way is subjected to developing and rinsing. As a result, colored resin patterns 116, 117 and 118 with photoresist as shown in FIG. 11D can be formed on colored resin patterns 112, 113 and 114, which former are coincident with the latter in size, in other words, have photoresist patterns self-aligned with the latter.

Figure 11E:
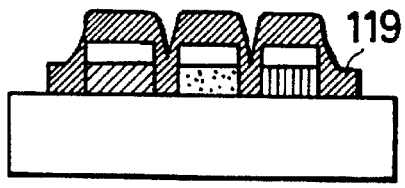
Figure 11F:
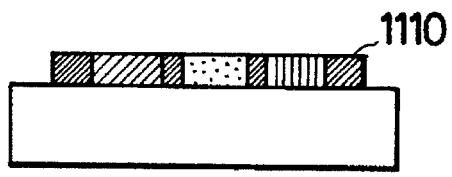

Subsequently, on the substrate having thereon resin patterns 116, 117 and 118 with photoresist, non-light-transmissive metallic film 119 is formed as shown in FIG. 11E. Thereafter, using a solution capable of dissolving only the photoresist pattern, the non-light-transmissive metallic film positioned at the tops of colored resin patterns 112, 113 and 114 is lifted off, so that there can be obtained a color filter comprising non-light-transmissive metal pattern 1110 closely disposed between color filter picture elements of respective colors, as shown in FIG. 11F.

Figure 11G:
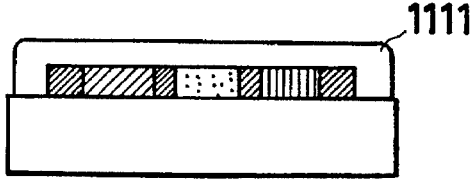

Protective film 1111 can also be optionally formed on the top of the color filter as shown in FIG. 11G.

The resin used to form the colored resin pattern of the color filter according to the present invention can be arbitrarily selected from gelatin, casein, glue, polyvinyl alcohol, polyimide, polyamidoimide, polyesterimide, polyamide, polyester, polyparaxylylene, polycarbonate, polyvinyl acetal, polyvinyl acetate, polystyrene, cellulose resin, melamine resin, urea resin, acrylic resin, epoxy resin, polyurethane resin, polysilicone resin, and a resin obtained by imparting photosensitivity to any of these resins, as well as commonly available photoresist resins. In particular, however, the resins set out below are preferred from the viewpoints of the required performance of the color filter and the workability of patterns.

That is to say, preferred are polyamide resins and polyimide resins of an aromatic type, having a photosensitive group in the molecule. Particularly preferred are polyamide resins of an aromatic type, capable of obtaining a cured film at 200° C. or less and having no specific light absorption characteristics (those having a light transmittance of about 90% or more) at the visible wavelength region (400 to 700 nm).

The coloring material that forms the colored resin pattern of the color filter according to the present invention includes organic pigments, inorganic pigments, and dyes, on which there are no particular limitations so long as they can obtain the desired spectral characteristics. In this instance, the materials can be used alone, or as a mixture of some of these. Taking account of the color characteristics and a variety of performance, however, organic pigments are most preferred as the coloring material.

Used as the organic pigments are azo pigments such as a soluble azo type, an insoluble azo type and a condensed azo type, as well as condensed polycyclic pigments such as an indigo type, an anthraquinone type, a perylene type, a perynone type, a dioxazine type, a quinacridone type, an isoindolidone type, a phthalone type, a methine or azomethine type, and other metal complex types, or a mixture of some of these.

In the present invention, the colored resin solution used to form the colored resin pattern is prepared by mixing the above coloring material having the desired spectral characteristics in the above resin solution in a proportion of approximately from 10 to 150%, and thoroughly dispersing the mixture by means of ultrasonic waves or a three-roll mill, followed by filtering to remove particles of a large diameter.

The colored resin pattern of the color filter according to the present invention is formed by applying the above colored resin solution on the substrate by means of a coating apparatus such as a spinner, a roll coater and a printer and formed into a pattern through a photolithographic process or formed into a pattern through a printing process. The film thickness thereof depends on the spectral characteristics as desired, but should range usually from 0.5 to 5 µm, and preferably from 1 to 2 µm, in approximation.

The photoresist film formed on the colored resin pattern in the present invention may comprise a positive photoresist resin commonly available. In particular, it is arbitrarily selected from materials that may not cause damage such as dissolving, cracking or swelling to the colored resin pattern disposed at the lower layer when coating is carried out, and also may readily dissolve when the metallic film is lifted off.

This photoresist film is provided by coating on the colored resin pattern in the same manner as the formation of the above colored resin pattern; using a coating apparatus such as a spinner, a roll coater and a printer. It may suitably have a film thickness of usually from 0.5 to 5 µm, and preferably from 1 to 2 µm, in approximation.

Materials for the non-light-transmissive metallic film in the present invention can be arbitrarily selected from commonly available metallic materials including Cr, Al, Ni, Mo and Cu. In particular, in the Instance of liquid crystal displays, they may preferably be selected from those having a smaller specific resistance in order to decrease the resistivity of the transparent electrode.

The non-light-transmissive metallic film is formed by vacuum film forming such as vacuum deposition or sputtering of the above metallic materials, and may suitably have a film thickness of from 100 Å to 3 µm, and preferably from 1,000 Å to 2 µm, in approximation. The film thickness of this non-light-transmissive metallic film may be made substantially equal to the colored resin pattern the color filter has, so that a remarkable effect can be seen in making flat the color filter, and, when used in liquid crystal displays or the like, it becomes possible to form a display panel causing less orientation irregularity of liquid crystal and having a superior display quality level. The film may further be brought into electrical contact with the transparent electrode formed on the color filter, so that it also becomes possible to set up a low-resistivity wiring. This serves as a countermeasure to the signal delay in large screen display or a countermeasure to the heat generation in the panel, making it possible to form a panel with a superior display quality level.

With respect to the colored resin pattern of the color filter according to the present invention, a protective film may optionally provided on its surface. This protective layer can be provided by a coating process such as spin coating or roll coating, or a vacuum deposition process, using, for example, organic resins of a polyamide, polyimide, polyurethane, polycarbonate, acrylic, epoxy or silicone type, or inorganic materials such as $Si_3N_4$, $SiO_2$, $SiO$, $Al_2O_3$ and $Ta_2O_3$.

The color filter having the colored resin pattern as described above can be formed on a suitable substrate. The substrate includes, for example, glass sheets, transparent resin sheets, resin films, CRT display surfaces or light-receiving surfaces of image pickup tubes, wafers on which a solid image pickup device such as CCD, BBD, CID or BASIS is formed, contact type image sensors using a thin-film semiconductor, liquid crystal display surfaces, and photosensitive materials for color electrophotography.

In instance in which the adhesion between the colored resin pattern and the base substrate must be further increased, the colored resin pattern may be formed after the substrate is previously thinly coated with a silane coupling agent, or the color filter may be formed using a colored resin comprising a silane coupling agent or the like previously added in a small amount. A greater effect can be thus obtained.

EXAMPLE 5

On a glass substrate, a green colored resin material [a photosensitive colored resin material prepared by dispersing Lionol Green 6YK (trade name; a product of Toyo Ink Mfg. Co., Ltd.; C.I. No. 74265) in PA-1000 (trade name; a product of Ube Industries, Ltd.; polymer content: 10%; solvent: N-methyl-2-pyrrolidone; pigment:polymer=1:2 mixture)] was applied by spin coating to have a film thickness of 1.5 µm.

Next, pre-baking was carried out on the resulting colored resin film at 70° C. for 30 minutes, followed by exposure using a high pressure mercury lamp through a pattern mask corresponding with the pattern form intended to be formed.

After the exposure was completed, developing was carried out using ultrasonic waves, with a developing solution exclusively used therefor, capable of dissolving only the unexposed area of the colored resin film (a developing solution mainly composed of N-methyl-2-pyrrolidone), and then treatment with a rinsing solution exclusively used therefor (a rinsing solution mainly composed of 1,1,1-trichloroethane) was carried out, followed by post-baking at 150° C. for 30 minutes to form a green colored resin layer having a given pattern form.

Next, on the substrate on which this green colored resin layer having a pattern form was formed, a second color, red colored pattern was formed at given position on the substrate in the same manner as the above, except that a red colored resin material [a photosensitive colored resin material prepared by dispersing Irgazin Red BRT (trade name; a product of Ciba-Geigy Corp.; C.I. No. 71127) in PA-1000 (trade name; a product of Ube Industries, Ltd.; polymer content: 10%; solvent: N-methyl-2-pyrrolidone; pigment:polymer= 1:2 mixture)] was used.

On the substrate on which two-color, colored resin patterns were formed in this way, a third color, red colored pattern was formed at given position on the substrate in the same manner as the above, except that a blue colored resin material [a photosensitive colored resin material prepared by dispersing Heliogen Blue L7080 (trade name; a product of BASF Corp.; C. I. No. 74160) in PA-1000 (trade name; a product of Ube Industries, Ltd.; polymer content: 10%; solvent: N-methyl-2-pyrrolidone; pigment:polymer=1:2 mixture)] was used. Three-color, R. G. B. colored resin patterns were thus obtained.

On the substrate having thereon the three-color, colored resin patterns obtained in this way, positive photoresist HPR-1182 (trade name; a product of Fuji-Hunt Electronics Technology Co.) was applied by spin coating to have a film thickness of 1.5 µm, followed by pre-baking at 100° C. for 30 minutes, and thereafter the whole surface was exposed to light using a high pressure mercury lamp from the back side of the substrate. After the exposure was completed, development processing was carried out using a developing solution exclusively used therefor, capable of only dissolving the exposed area of the photoresist, followed by rinsing with water. Photoresist film patterns self-aligned and identical in size were thus formed on the three-color, colored resin patterns.

Next, on the substrate having these on the three-color, colored patterns with photoresist, aluminum was vacuum deposited with a film thickness of 1.0 µm. The resulting substrate was thereafter immersed in a solvent (acetone) capable of dissolving the positive photoresist to remove the photoresist and aluminum on the colored patterns.

The color filter thus obtained had the structure in which the metallic films were closely disposed between the patterns of respective colors. The color filter thus obtained was also superior in the properties such thermal resistance, light-resistance and mechanical properties.

EXAMPLE 6

Figure 12:
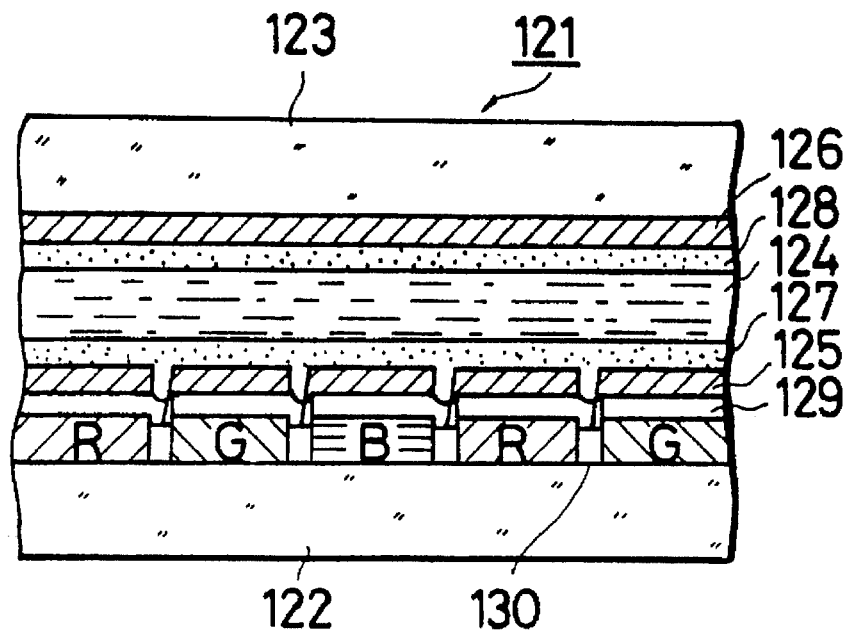
FIG. 12 is a cross section of a liquid crystal display panel in which the functional substrate of the present invention is employed.

Using the color filter formed in Example 5, ferroelectric liquid crystal device 121 having the structure as shown in FIG. 12 was fabricated in the following manner.

Namely, on the color filter having non-light-transmissive metallic film 130 between the color filter picture elements, a film of photosensitive polyimide PI-300 (trade name; a product of Ube Industries, Ltd.) was formed by coating with a film thickness of 1.0 µm as protective film 129.

Next, exposure, developing and rinsing were carried out using a pattern mask corresponding with the pattern form and coming into contact with the non-light-transmissive metallic film, followed by post-baking to form a protective film pattern having a through-hole on the non-light-transmissive metallic film.

Then, a film was formed by sputtering of ITO with a thickness of 1,500 Å, and pattern formation was carried out to make it come into contact with the non-light-transmissive metallic film, to obtain transparent electrode pattern 125. Subsequently, polyimide was applied by printing with a film thickness of 100 Å as orientation control film 127, and then a rubbing treatment was applied.

Between the color filter substrate thus obtained and an opposed substrate obtained in the same way, silica beads of 1.5 µm in diameter were scattered, and both the substrates were laminated to make cell compilement in the manner that the stripe-shaped pattern electrodes thereof may cross at right angles, followed by injection of ferroelectric liquid crystal 124 and sealing, to obtain liquid crystal device 121.

Resulting ferroelectric liquid crystal device 121 showed a superior contrast and color purity. Since the transparent electrodes were made to have a low resistance by virtue of the non-light-transmissive metallic film applied with the contact, the device was found excellent, without signal delay and any lowering of display quality level caused by heat generation in the cell. Moreover, the filter with less faulting (difference in level) made it possible to obtain a liquid crystal device having less defective orientation.

EXAMPLE 7

Using a thin-film transistor as a substrate, fabrication of a color liquid crystal display device comprising a color filter formed on said substrate according to the method of the present invention was carried out in the following way.

Figure 13A:
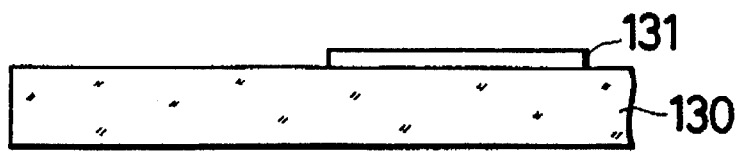
FIG. 13(13A to 13H) is a process of forming a thin-film transistor array used in the present invention.
Figure 13B:
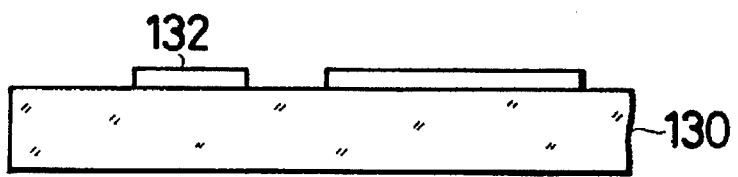

First, as shown in FIG. 13A, ITO picture element electrode 131 with a layer thickness of 1,000 Å was formed on glass substrate 130 (trade name: 7059; a product of Corning Glass Works) to have the desired pattern. Thereafter, on the surface thereof, aluminum was further vacuum deposited with a layer thickness of 1,000 Å, and the resulting deposit was subjected to patterning to the desired shape according to photolithoetching to form gate electrode 132 as shown in FIG. 13B.

Figure 13C:
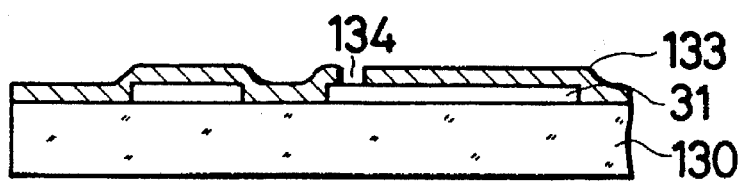

Subsequently, a photosensitive polyimide was applied on the surface of substrate 130 on which the above electrodes were provided, to form insulating layer 133, followed by pattern exposure and development processing to form through hole 134 as shown in FIG. 13C. This through-hole 134 constitutes a contact between drain electrode 138 and picture element electrode 131.

Figure 13D:
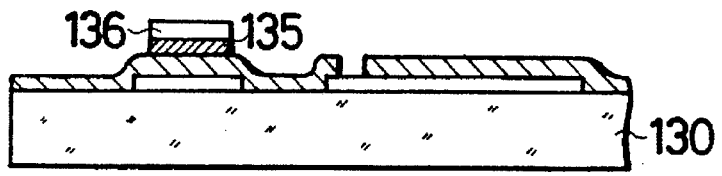
Figure 13E:
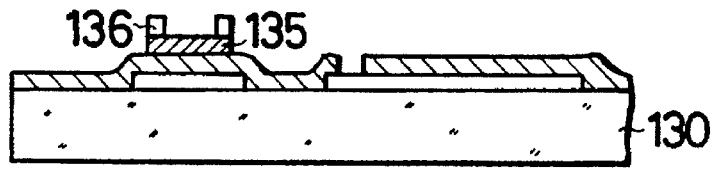

Here, substrate 130 was set at given position in a deposition chamber. Into the deposition chamber, $SiH_4$ diluted with $H_2$ was introduced to carry out glow discharging in vacuum to deposit on the whole surface of substrate 130 provided with above electrodes 131 and 132 and insulating layer 133, photoconductive layer (intrinsic layer) 135 comprising a-Si and having a layer thickness of 2,000 Å. Thereafter, on this photoconductive layer 135, $n^+$ layer 136 with a layer thickness of 1,000 Å was laminated as shown in FIG. 13D according to a similar procedure subsequently taken. This substrate 130 was taken out of the deposition chamber, and above $n^+$ layer 136 and photoconductive layer 135 in this order were respectively subjected to patterning by dry etching to the desired shapes as shown in FIG. 13E.

Figure 13F:
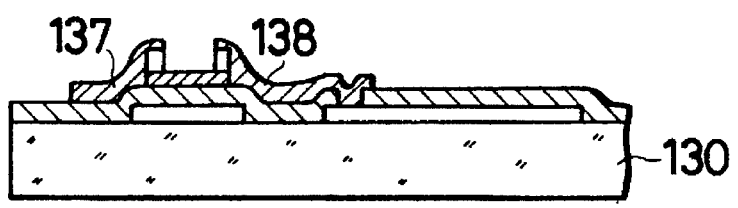

Next, on the substrate surface on which photoconductive layer 135 and n layer 136 were provided in this way, aluminum was vacuum deposited with a layer thickness of 1,000 Å. Thereafter, the resulting aluminum deposit was subjected to patterning by photolithoetching to have the desired shape. Source electrode 137 and drain electrode 138 were thus formed as shown in FIG. 13F.

Figure 13G:
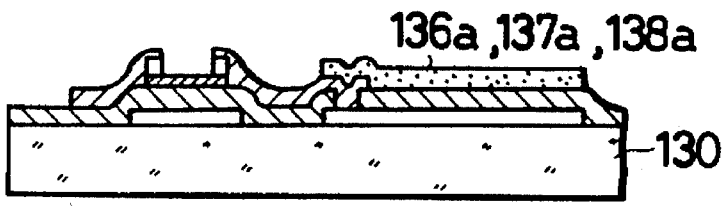
Figure 13H:
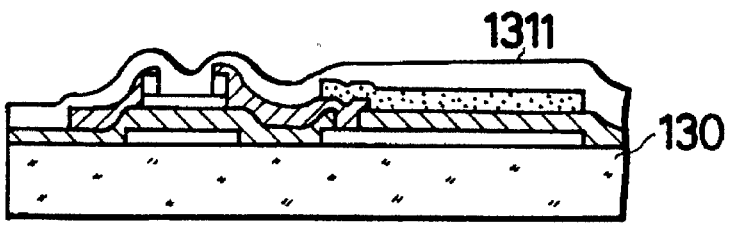

Finally, according to the same procedure as Example 5, three-color, red, blue and green colored patterns 136a, 137a and 138a were formed as shown in FIG. 13G, corresponding with each picture element electrode 131, with the insulating layer interposed therebetween. Thereafter, as shown in FIG. 13H, a polyimide resin as insulating film 1311 to which an orientation function was imparted was applied on the whole surface of this substrate to have a layer thickness of 1,200 Å, followed by curing of the resin by heat treatment at 250° C. for 1 hour. A thin-film transistor integrated with the color filter was thus prepared.

Using the thin-film transistor with the color filter, thus prepared, a color liquid crystal display device was further fabricated.

More specifically, an ITO electrode layer of 1,000 Å thick was formed on one side of a glass substrate (trade name: 7059; a product of Corning Glass Works) according to the same procedure as the above, and an insulating layer with a layer thickness of 1,200 Å, comprising polyimide resin to which an alignment function was imparted was further formed on the electrode layer. A liquid crystal was sealed between this substrate and the previously fabricated thin-film transistor with the color filter, and the whole was fixed to obtain the color liquid crystal display device.

The color liquid crystal display device thus fabricated had good characteristics.

EXAMPLE 8

Example 7 was repeated to obtain a color liquid crystal display device having the color filter formed by the method of the present invention, except that the three-color color filter was not provided on the picture element electrode, but instead provided on the opposed electrode.

The color liquid crystal display device thus fabricated had good characteristics.

EXAMPLE 9

Example 8 was repeated to obtain a color liquid crystal display device having the color filter formed by the method of the present invention, except that the three-color color filter was first formed on the opposed substrate and thereafter the opposed electrode was provided.

The color liquid crystal display device thus fabricated had good characteristics.

EXAMPLE 10

Example 5 was repeated to obtain a color solid image pickup device having the color filter formed by the method of the present invention, except that a wafer on which a CCD (charge coupled device) was formed was used as the substrate and the three-color stripe color filter was formed in the manner that each colored pattern of the color filter may be disposed corresponding with each light-receiving cell possessed by the CCD, with the insulating layer interposed therebetween.

The color solid image pickup device thus fabricated had good characteristics.

EXAMPLE 11

The color filter formed in Example 5 was stuck on a wafer on which a CCD (charge coupled device) was formed, with registration so made that each colored pattern of the color filter may be disposed corresponding with each light-receiving cell possessed by the CCD. A color solid image pickup device was thus fabricated.

The color solid image pickup device thus fabricated had good characteristics.

EXAMPLE 12

Figure 14:
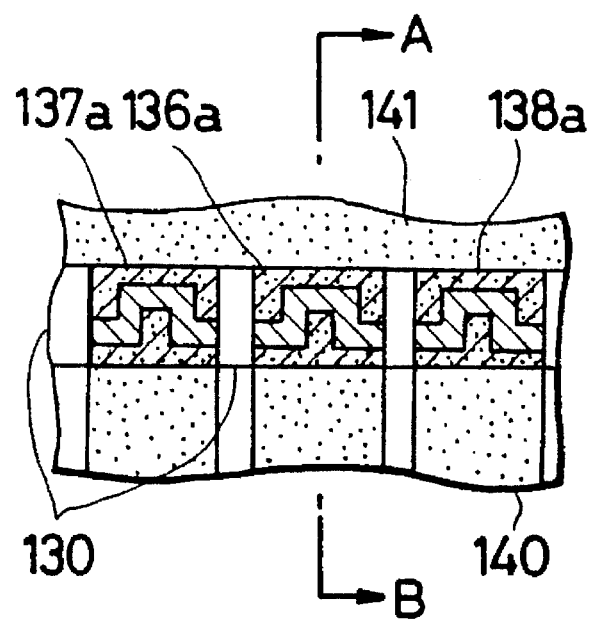
FIG. 14 is a diagramatical plan view of a photosensor array used in the present invention.

A color photosensor array, as schematically illustrated in a partial plan view of FIG. 14, having the color filter formed by the method of the present invention was prepared in the following manner according to the process as shown in FIG. 15.

Figure 15A:
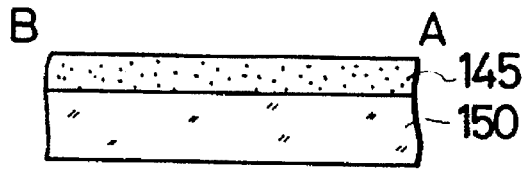
FIG. 15(15A to 15G) is a process of forming the photosensor array used in the present invention.

First, as shown in FIG. 15A, photoconductive layer (intrinsic layer) 145 comprising an a-Si (amorphous silicon) layer was provided by glow discharging on glass substrate 150 (trade name: 7059; a product of Corning Glass Works). More specifically, $SiH_4$ diluted with $H_2$ to 10 vol. % was deposited on the substrate, under a gas pressure of 0.50 Torr and an RF (radio frequency) power of 10 W, at a substrate temperature of 250° C. for 2 hours, to obtain photoconductive layer 145 with a film thickness of 0.7 μm.

Figure 15B:
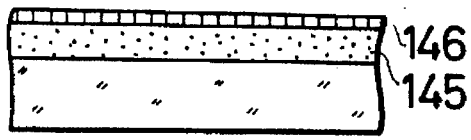

Subsequently, on this photoconductive layer 145, $n^+$ layer 146 was provided by glow discharging, as shown in FIG. 15B. More specifically, using as a starting material a 1:10 mixed gas of $SiH_4$ diluted with $H_2$ to 10 vol. % and $PH_3$ diluted with $H_2$ to 100 ppm and setting other conditions same as conditions for the deposition of photoconductive layer 145 previously provided, $n^+$ layer 146 with a layer thickness of 0.1 μm was continuously provided on photoconductive layer 145.

Figure 15C:
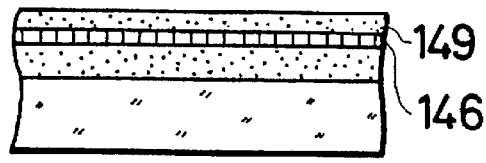

Next, as shown in FIG. 15C, aluminum was deposited by electron beam vacuum deposition on $n^+$ layer 146 to have a layer thickness of 0.3 μm. Conductive layer 149 was thus formed.

Figure 15D:
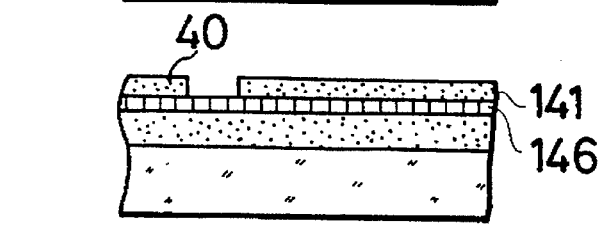

Subsequently, as shown in FIG. 15D, the part corresponding to the part serving as a photoconversion area was removed. More specifically, using a photoresist, positive type Microposit 1300-27 (trade name; a product of Shipley Co.), a photoresist pattern was formed in the desired shape. Thereafter conductive layer 149 at the uncovered area (the part provided with no resist pattern) was removed from the surface of the substrate, using an etchant obtained by mixing phosphoric acid (an aqueous 85 vol. % solution), nitric acid (an aqueous 60 vol. % solution), glacial acetic acid and water in the proportion of 16:1:2:1, to form common electrode 141 and separate electrode 140.

Figure 15E:
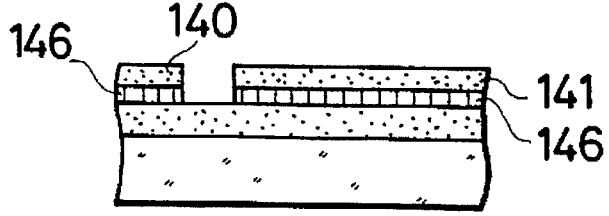

Next, as shown in FIG. 15E, the part serving as the photoconversion area, of $n^+$ layer 146 was removed. More specifically, after above photoresist Microposit 1300-2 was peeled from the substrate, dry etching was carried out for 5 minutes by plasma etching (also called reactive ion etching) with $CF_4$ gas under an RF power of 120 W and a gas pressure of 0.1 Torr, using parallel plate type plasma etching apparatus DEM-451 (manufactured by Nichiden Anelva Co.). $n^+$ Layer 146 at the uncovered area and part of the surface layer of photoconductive layer 145 were thus removed from the substrate.

In the present Example, in order to prevent implantation of the cathode material of the etching apparatus, a sputtering target of polysilicon (8 inches; purity: 99.999%) was place on the cathode. The sample was placed thereon and the part at which SUS of the cathode material was uncovered was covered with a Teflon sheet cut into the shape of a doughnut. Thus, the etching was carried out in the state that the SUS surface was little exposed to plasma. Thereafter, heat treatment was carried out at 20° C. for 60 minutes in an oven in which nitrogen was flowed at a rate of 3 l/min.

Next, on the surface of the photosensor array thus prepared, protective layer 147 was formed in the following manner.

Figure 15F:
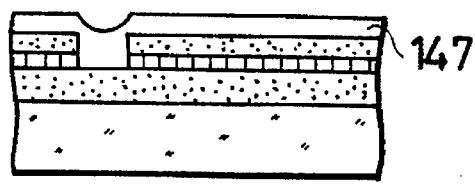
Figure 15G:
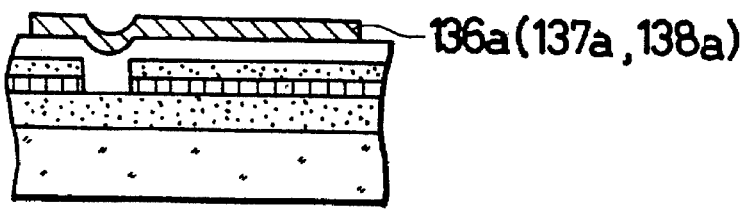

Namely, a silicon nitride layer as protective layer 147 was formed by glow discharging on the photosensor array. More specifically, using a mixed gas obtained by mixing $SiH_4$ diluted with $H_2$ to 10 vol. % and 100% $NH_3$ in a flow rate ratio of 1:4 and setting other conditions same as the procedure for the formation of the a-Si layer previously provided, protective layer 147 comprising a silicon nitride (a-SiNH) layer of 0.5 μm in layer thickness was formed as shown in FIG. 15F.

On this protective layer 147 serving as a substrate, a color filter comprised of three-color, red, blue and green, colored patterns was formed in the same manner as Example 5, and thereafter a protective layer was formed. The color photosensor array device as shown in FIG. 14, comprising colored patterns 136a, 137a and 138a respectively disposed on each photosensor, was thus formed. The numeral 130 denotes a non-light-transmissive metallic film pattern.

The photosensor array formed in the present Example had good characteristics.

EXAMPLE 13

The color filter formed in Example 5 was stuck on the photosensor array as shown in FIG. 15F, fabricated in Example 12, using an adhesive. A color photosensor array was thus fabricated.

The color photosensor fabricated in the present Example also had good characteristics like the one prepared in Example 12.

As having been described above, according to the present invention in which the colored resin pattern for forming the color filter picture element is utilized as the photomask in forming the resist pattern for lift-off, the resist pattern can be formed in the form aligned with the color filter picture element, so that it has been self-aligned when the metallic film pattern is formed. Hence, it becomes possible to provide the non-light-transmissive metallic film between the color filter picture elements of respective colors without a gap according to a simple method.

Thus, the image pickup device or sensor device disposed with such a color filter can achieve;

(1) an improvement in color reproducibility; and (2) prevention of misoperation of an optical device.

In the instance of liquid crystal display devices, superior effect can be obtained, e.g., in respect of;

(1) an improvement in contrast and color purity;

(2) a decrease in defective orientation because of an improvement in flatness, and an improvement in display quality level, attributable thereto; and, (3) because of the non-light-transmissive metallic film utilized as an electrode auxiliary wire, prevention of signal delay, or prevention of a lowering of display quality level, caused by heat generation in the cell.

In still another embodiment, the present invention is a method of preparing a color filter having a non-light-transmissive metallic film closely disposed between color filter picture elements of respective colors on a substrate. The steps that can be used therein comprise;

a step of forming on a substrate a first colored resin film comprising a colored material incorporated in a resin, laminating a photoresist film on said colored resin film, followed by exposure and developing through a mask to carry out simultaneous patterning of the photoresist film and colored resin film;

a step of repeating the above step several times using a colored resin comprising a coloring material having a different hue to form a plural color of colored resin patterns;

a step of forming a non-light-transmissive metallic film on the substrate on which said plural color of colored resin patterns have been formed; and a step of dissolving only said photoresist film to lift off the metallic film formed on the tops of the plural color of colored resin patterns.

According to the above constitution, the pattern for lifting off the metallic film is also formed at the same time with the formation of a color filter picture element, so that it gives a self-aligned form when the metallic film pattern is formed. Hence, the non-light-transmissive metallic film can be closely provided between the color filter picture elements of respective colors according to a simple procedure. In the instance of image pickup devices or sensor devices that employ such a color filter, an improvement in color reproducibility can be expected, and also the satisfactory light-screening leads to the prevention of misoperation of an optical device. In the instance of liquid crystal display devices, an improvement in contrast and color purity can be expected, and also it becomes possible to make them have together a function as an electrode auxiliary wire. In addition, the wiring of picture element electrodes can be made with low resistivity. This is effective for preventing signal delay in large screen display and also preventing display quality level from being lowered because of the heat generation in the cell.

Moreover, when compared with conventional ones, the device can take a superior color filter structure with more flatness. Thus, in the type the color filter is built in a liquid crystal display, a device suffering less defective alignment and having a superior display quality level can be obtained.

FIGS. 16A to 16G constitute a flow sheet to illustrate a typical embodiment of a process for preparing the color filter according to the present invention.

Figure 16A:
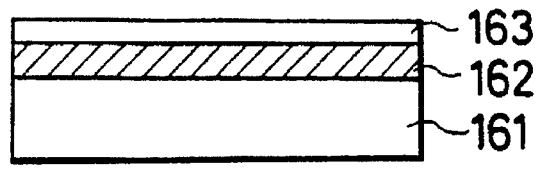
FIGS. 16(16A to 16G) and 17(17A to 17E) cross-sectionally illustrate processes of forming the color filter of the present invention.

First, as shown in FIG. 16A, colored resin pattern 162 is formed on substrate 161 to have a given film thickness, using a first colored resin solution comprising a coloring material dispersed in a resin, followed by pre-baking under suitable temperature conditions. Subsequently, a photoresist using a solvent that may not dissolve this colored resin is applied on this colored resin film 162, followed by post-baking to obtain a film of two-layer structure, comprised of colored resin film 162 and photoresist film 163.

Figure 16B:
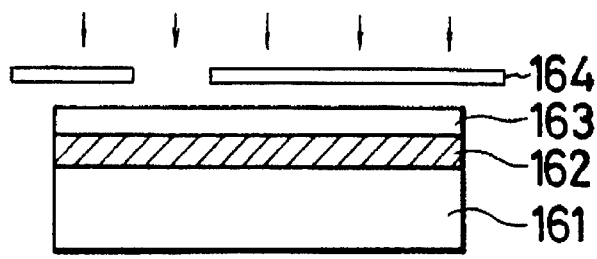

Next, as shown in FIG. 16B, using light (e.g., light of a high pressure mercury lamp or the like) capable of affecting both photoresist film 163 and colored resin film 162 or only photoresist film 163, exposure is carried out through a photomask 164 having a given pattern form corresponding with the pattern intended to be formed. Then, after developing and rinsing were carried out, post-baking is carried out to obtain colored resin pattern 165 of two-layer structure with the photoresist film disposed on its top, as shown in FIG. 16C.

Figure 16C:
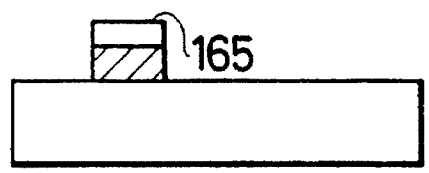
Figure 16D:
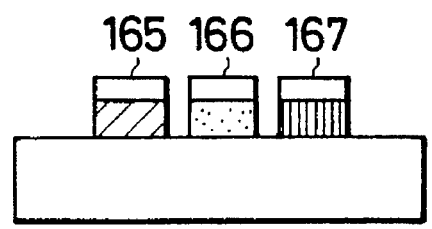

In instances in which a color filter comprised of two or more colors is formed, the steps of from FIG. 16A to FIG. 16C may be further repeated depending on what are required, i.e., depending on the number of the colors of filters, respectively using colored resin solutions in which coloring materials corresponding to the respective colors are dispersed. Thus, it is possible to form color filter picture elements of three-color colored resin patterns 165, 166, 167 with photoresist as shown, for example, in FIG. 16D.

Figure 16E:
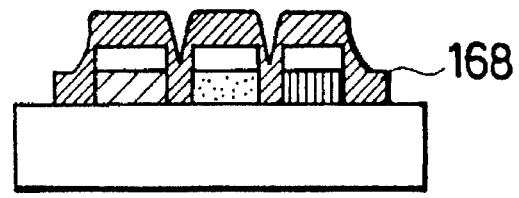
Figure 16F:
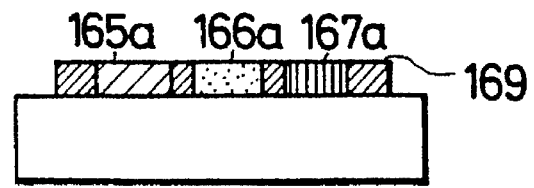

Next, on the color filter substrate thus formed, non-light-transmissive metallic film 168 is formed as shown in FIG. 16E. Subsequently, lifting-off of the non-light-transmissive metallic film is carried out using a solution capable of dissolving only the photoresist film positioned at the tops of the colored resin patterns. Thus, there can be obtained a color filter comprising non-light-transmissive metal pattern 169 closely disposed between color filter picture elements 165a, 166a and 167a of respective colors, as shown in FIG. 16F.

Figure 16G:
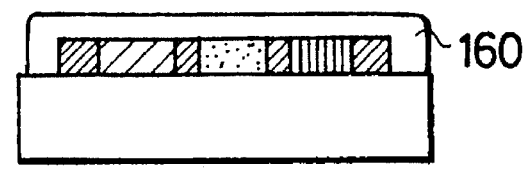

Protective film 160 can also be optionally formed on the top of the color filter as shown in FIG. 16G.

EXAMPLE 14

On a glass substrate, a blue colored resin material capable of obtaining the desired spectral characteristics [a photosensitive colored resin material prepared by dispersing Heliogen Blue L7080 (trade name; a product of BASF Corp.; C.I. No. 74160) in PA-1000 (trade name; a product of Ube Industries, Ltd.; polymer content: 10% solvent: N-methyl-2-pyrrolidone; pigment:polymer=1:2 mixture) and diluting the resulting dispersion with a cellosolve solvent] was applied by spin coating to have a film thickness of 1.5 μm, followed by pre-baking at 70° C. for 20 minutes.

Next, on the resulting colored resin layer, a photosensitive polyimide resin diluted with a cellosolve solvent was applied by spin coating with a film thickness of 1.0 μm, followed by pre-baking at 80° C. for 30 minutes.

The colored resin layer and photoresist layer were simultaneously exposed to light, using a high pressure mercury lamp through a pattern mask corresponding with the pattern form intended to be formed. After the exposure was completed, developing was carried out using ultrasonic waves, with a developing solution exclusively used therefor, capable of dissolving only the unexposed area of the colored resin film, and then treatment with a rinsing solution exclusively used therefor was carried out, followed by post-baking at 150° C. for 30 minutes to form a blue colored resin film with photoresist, having a given pattern form.

Subsequently, on the substrate on which the blue colored resin layer with photoresist was formed, a second color, green colored pattern with photoresist was formed at given position on the substrate in the same manner as the above, except that a green colored resin material [a photosensitive colored resin material prepared by dispersing Lionol Green 6YK (trade name; a product of Toyo Ink Mfg. Co., Ltd.; C.I. No. 74265) in PA-1000 (trade name; a product of Ube Industries, Ltd.; polymer content: 10%; solvent: N-methyl-2-pyrrolidone; pigment:polymer=1:2 mixture) and diluting the resulting dispersion with a cellosolve solvent] was used.

On the substrate on which blue and green colored resin patterns with photoresist thus obtained were formed, a third color, red colored pattern with photoresist was further formed at given position on the substrate in the same manner as the above, except that a red colored resin material [a photosensitive colored resin material prepared by dispersing Irgazin Red BRT (trade name; a product of Ciba-Geigy Corp.; C.I. No. 71127) in PA-1000 (trade name; a product of Ube Industries, Ltd.; polymer content: 10%; solvent: N-methyl-2-pyrrolidone; pigment:polymer=1:2 mixture) and diluting the resulting dispersion with a cellosolve solvent] was used. Colored patterns with photoresist, of R (red), G (green) and B (blue) three-color stripes were thus obtained.

On the substrate having thereon the three-color stripes, colored resin patterns with photoresist obtained in this way, aluminum was vacuum deposited with a film thickness of 1.0 μm. The resulting substrate was thereafter immersed in a solvent capable of dissolving the positive photoresist layer i.e., the photosensitive polyimide pattern which was in an uncured state, to remove the photoresist and aluminum on the colored patterns, using ultrasonic waves.

The color filter thus obtained had the structure in which the metallic films were closely disposed between the stripe patterns of respective colors. The color filter thus obtained was also superior in the properties such as thermal resistance, light-resistance and mechanical properties.

EXAMPLE 15

On a glass substrate, a blue colored resin material capable of obtaining the desired spectral characteristics [a photosensitive colored resin material prepared by dispersing Heliogen Blue L7080 (trade name; a product of BASF Corp.) in an aqueous polyvinyl alcohol resin solution containing ammonium dichromate as a crosslinking agent] was applied by spin coating to have a film thickness of 1.0 μm, followed by drying at 90° C. for 10 minutes. Thereafter, a negative photoresist [OMR-83 (trade name; a product of Tokyo Ohka Kogyo Co., Ltd.)], was applied by spin coating with a film thickness of 1.0 μm, followed by pre-baking at 80° C. for 20 minutes. Then, the colored resin film and photoresist film were simultaneously exposed to light, using a high pressure mercury lamp through a pattern mask corresponding with the pattern form intended to be formed. After the exposure was completed, developing was carried out using a developing solution exclusively used therefor, and then treatment with a rinsing solution exclusively used therefor was carried out, followed by developing of the colored resin film, using a water/IPA mixed solution. Post-baking was then carried out at 150° C. for 30 minutes to form a blue colored resin film with photoresist, having a given pattern form.

Subsequently, R, G and B three-color mosaic colored patterns with photoresist were formed in the same manner as the above, except that a second color, green colored resin material [a photosensitive colored resin material prepared by dispersing Lionol Green 6YK (trade name; a product of Toyo Ink Mfg. Co., Ltd.) in an aqueous polyvinyl alcohol resin solution containing ammonium dichromate as a crosslinking agent] and a third color, red colored resin material [a photosensitive colored resin material prepared by dispersing Irgazin Red BRT (trade name; a product of Ciba-Geigy Corp.) in an aqueous polyvinyl alcohol resin solution containing ammonium dichromate as a crosslinking agent] were used.

On the substrate having thereon the three-color mosaic colored resin patterns with photoresist obtained in this way, chromium was vacuum deposited with a film thickness of 1,000 Å. The resulting substrate was thereafter immersed with shaking in a solvent capable of dissolving the photoresist to remove the photoresist and chromium on the colored patterns.

The color filter thus obtained had the structure in which the metallic films were closely disposed between the mosaic patterns of respective colors.

In a further embodiment, the present invention is a method of preparing a color filter having a metallic film closely disposed between color filter picture elements of respective colors on a substrate, comprising the steps of;
  (a) forming conductive film patterns on the substrate;
  (b) forming between said conductive film patterns, color filter picture elements comprising a plural color of colored resin patterns in such a manner that the colored resin patterns may each have a width larger than the width between said conductive film patterns and may each have a gap between adjacent picture elements on said conductive film patterns; and
  (c) applying metallic coating selectively on the conductive film provided at least between said plural color of colored resin patterns. Thus, the metallic film can be closely formed between color filter picture elements of respective colors.

According to the method of preparing the color filter of the present invention, the conductive film pattern and color filter pattern (colored resin pattern) to be applied with metallic coating are formed overlapping each other in part, so that the conductive film is closely uncovered at least between color filter patterns. Consequently, application of the metallic coating on this conductive film makes it possible to closely form metallic films between the color filter picture elements of respective colors.

In the instance of image pickup devices or sensor devices that employ such a color filter, an improvement in color reproducibility can be expected, and also the satisfactory light-screening leads to the prevention of misoperation of an optical device. In the instance of liquid crystal display devices, an improvement in contrast and color purity can be expected, and also it becomes possible to make them have together a function as an electrode auxiliary wire. In addition, the wiring of picture element electrodes can be made with low resistivity. This is effective for preventing signal delay in large screen display and also preventing display quality level from being lowered because of the heat generation in the cell.

Moreover, when compared with conventional ones, the device can take a superior color filter structure with more flatness. Thus, in the type the color filter is built in a liquid crystal display, a device suffering less defective orientation and having a superior display quality level can be obtained.

FIGS. 17A to 17E constitute a flow sheet to illustrate a typical embodiment of a process for preparing the color filter according to the present invention.

Figure 17A:
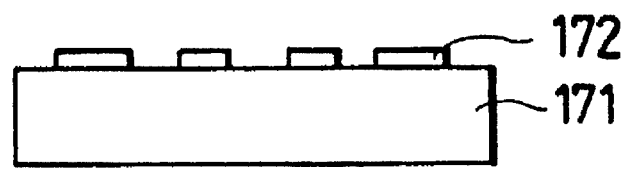
Figure 17B:
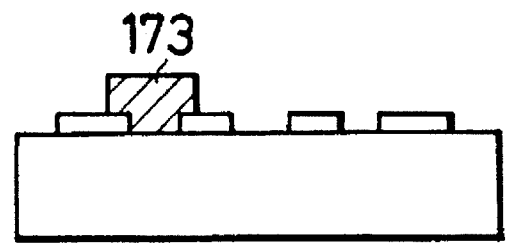
Figure 17C:
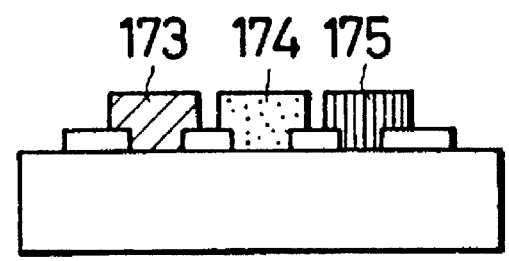

First, as shown in FIG. 17A, after a conductive film is formed on substrate 171, patterning is carried out to form conductive film patterns 172 with a gap width smaller than the width of a color filter pattern. Next, as shown in FIG. 17B, a color filter pattern 173 is formed between the conductive film patterns in such a manner that the color filter pattern may have a width larger than the width between the conductive film patterns and may have a gap between adjacent picture elements on said conductive film patterns. Then, this formation of the pattern comprising a colored resin is repeated several times using a colored resin having a different hue. Thus, color filter picture elements comprised of the three-color, colored resin patterns 173, 174 and 175 are formed as shown in FIG. 7C.

Figure 17D:
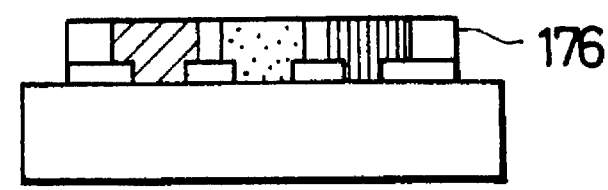
Figure 17E:
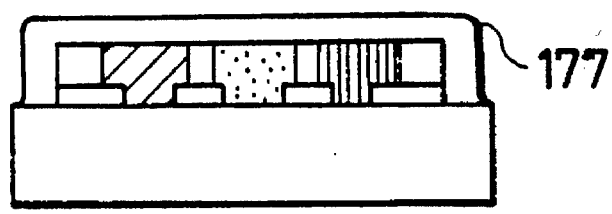

Using the color filter substrate thus formed, a metal film is deposited on conductive film pattern 172 through an electrical or chemical means, while keeping selectivity between the surface of the uncovered conductive film pattern and the color filter picture element. Thus, metallic film pattern 176 can be closely formed between the color filter picture elements as shown in FIG. 17D. As shown in FIG. 17E, protective film 177 can also be optionally formed on the top of the color filter picture elements.

EXAMPLE 16

On a glass substrate, an ITO film was formed by sputtering with a thickness of 5,000 Å, and conventional patterning was carried out to form stripe-shaped patterns each having a width of 20 μm which is larger than the gap width 10 μm between color filter patterns.

Next, between the ITO stripe patterns on this substrate, a stripe-shaped color filter pattern having a width of 90 μm which is larger than the gap width between the ITO patterns was formed according to the following procedure.

Namely, a blue colored resin material capable of obtaining the desired spectral characteristics [a photosensitive colored resin material prepared by dispersing Heliogen Blue L7080 (trade name; a product of BASF Corp.; C.I. No. 74160) in PA-1000 (trade name; a product of Ube Industries, Ltd.; polymer content: solvent: N-methyl-2-pyrrolidone; pigment:polymer=1:2 mixture)] was applied by spin coating to have a film thickness of 1.5 μm, followed by pre-baking at 70° C. for 30 minutes. Next, exposure was carried out using a high pressure mercury lamp through a pattern mask corresponding with the pattern form intended to be formed. After the exposure was completed, developing was carried out using ultrasonic waves, with a developing solution exclusively used therefor, capable of dissolving only the unexposed area of the colored resin film, and then treatment with a rinsing solution exclusively used therefor was carried out, followed by post-baking at 200° C. for 30 minutes to form a blue colored resin film having a given pattern form.

Subsequently, on the substrate on which the blue colored resin layer was formed, a second color, Green colored pattern was formed at given position on the substrate in the same manner as the above, except that a green colored resin material [a photosensitive colored resin material prepared by dispersing Lionol Green 6YK (trade name; a product of Toyo Ink Mfg. Co., Ltd.; C.I. No. 74265) in PA-1000 (trade name; a product of Ube Industries, Ltd.; polymer content: 10%; solvent: N-methyl-2-pyrrolidone; pigment:polymer= 1:2 mixture)] was used.

On the substrate on which blue and green patterns thus obtained were formed, a third color, red colored pattern was further formed at given position on the substrate in the same manner as the above, except that a red colored resin material [a photosensitive colored resin material prepared by dispersing Irgazin Red BRT (trade name; a product of Ciba-Geigy Corp.; C.I. No. 71127) in PA-1000 (trade name; a product of Ube Industries, Ltd.; polymer content: 10%; solvent: N-methyl-2-pyrrolidone; pigment:polymer=1:2 mixture)] was used. Colored patterns of R (red), G (green) and B (blue) three-color stripes were thus obtained between the ITO stripe patterns on the substrate, with a width larger than the gap width between them.

The ITO pattern of the color filter substrate thus obtained was connected to the negative pole, and electroplating was applied for 2 minutes at a current density of 0.1 (A/cm$^2$) in a Watts bath of 45° C. A nickel film with a film thickness of 1.35 μm was thus formed selectively on the uncovered ITO pattern.

The color filter thus obtained had the structure in which the metallic films were closely disposed between the stripe patterns of respective colors.

EXAMPLE 17

On a glass substrate, a Cu film was formed by sputtering with a thickness of 2,000 Å, and conventional patterning was carried out to form stripe-shaped patterns each having a width of 20 μm which is larger than the gap width 10 μm between color filter patterns.

Next, between the Cu stripe patterns on this substrate, a color filter comprising R (red), G (green) and B (blue) three-color stripes each having a width of 90 μm which is larger than the gap width between the Cu patterns was formed using the same colored resin materials and according to the same procedure as Example 16.

On the Cu pattern uncovered on the color filter substrate thus obtained, electroless Cu plating was applied to form substantially the same pattern with the color filter pattern.

The color filter thus obtained had the structure in which the metallic films were closely disposed between the stripe patterns of respective colors.

EXAMPLE 18

An example of the present invention will be described with reference to FIG. 1.

Referring to FIG. 1, on substrate 14 comprising a glass sheet, an aluminum film with a thickness of 1.0 µm was formed by sputtering, followed by patterning with a width of 30 µm. Low-resistivity electrode 12 having a light-screening function was thus formed. Next, photosensitive polyimide PI-300 (trade name; a product of Ube Industries, Ltd.) was applied on the whole surface by spin coating with a thickness of 2.0 µm, followed by mask exposure, and then patterning was carried out so as to give a through hole with a width of 10 µm on the aluminum pattern to provide insulating layer 13. Because of a danger of causing disconnection of transparent electrode 11, the pattern end of insulating film 13 should preferably be tapered. Accordingly, it was tapered by making treatment using rinsing solution PRI-127 (trade name; a product of Ube Industries, Ltd.), in the course of the step of the patterning of the PI-300 film. The transparent electrode 11 was provided by forming ITO into a film with a thickness of 0.1 µm by sputtering, followed by patterning with a width of 280 µm. The resistivity of the electrode thus formed was examined to find that the resistivity per 1 cm of pattern length was about 10 $\Omega$, which was about 1/100 when compared with the resistivity of about 1 K$\Omega$ of the case of only an ITO pattern with a width of 280 µm.

On the substrate shown in FIG. 1, an $SiO_2$ film as an insulating layer (not shown) was formed by sputtering with a thickness of 500 Å, and polyimide was applied thereon by printing with a thickness of 100 Å as an orientation control film (not shown), which were then applied with rubbing. An opposed substrate was also formed with the same constitution, and silica beads of 1.5 µm in diameter were scattered between the both substrates. Thereafter, they were laminated so that the rubbing directions may be the same, and then ferroelectric liquid crystal CS1014 (trade name; a product of Chisso Corporation) as the liquid crystal was injected into the cell. The cell thus prepared was placed between polarizers which were in a crossed nicols. While making observation on back light, signals were applied to the electrodes. As a result, short (or abnormal connection) was nowhere to be found. There was also little waveform dullness of the applied signals to picture elements. Moreover, the light coming through between picture elements, which causes a lowering of the display quality level, was perfectly screened or intercepted by low-resistivity electrode 12, so that there was seen a remarkable improvement in the display performance. Temperature irregularity in the cell when signals were applied to the cell for a long period of time was also examined to find that a great improvement was achieved as compared with a cell comprising electrodes formed only with ITO.

EXAMPLE 19

As another example of the present invention, an example in which the present invention is utilized in a color liquid crystal cell will be described with reference to FIG. 3.

On substrate 14 comprising a glass sheet, an aluminum film with a thickness of 1.0 µm was formed by sputtering, followed by patterning with a width of 30 µm. Low-resistivity electrode 12 having a light-screening function was thus formed. As color filter 31, a colored resin obtained by dispersing a pigment as a coloring matter in photosensitive polyamide PA-1000 C (trade name; a product of Ube Industries, Ltd.) was applied on the whole surface by spin coating with a thickness of 1.0 µm, followed by mask exposure, and then patterning was carried out. This above procedure was repeated three times to form a film having a function as an R, G and B three-color film. As insulating film 13, photosensitive polyimide PI-300 (trade name; a product of Ube Industries, Ltd.) was applied on the whole surface by spin coating with a thickness of 1.0 µm, followed by mask exposure, and then patterning was carried out so as to give a through hole with a width of 10 µm on the aluminum pattern. In the patterning of the PI-300 film, a treatment using rinsing solution PRI-127 (trade name; a product of Ube Industries, Ltd.) was made so that the pattern end was tapered. Transparent electrode 11 was provided by forming ITO into a film with a thickness of 0.1 µm by sputtering, followed by patterning with a width of 90 µm. The resistivity of the electrode thus formed was examined to find that the resistivity per 1 cm of pattern length was about 10 $\Omega$, which was about 1/300 when compared with the resistivity of about 3 K$\Omega$ of the case of only an ITO pattern with a width of 90 µm.

On the substrate thus prepared, an $SiO_2$ film as an insulating layer (not shown) was formed by sputtering with a thickness of 500 Å, and polyimide was applied thereon by printing with a thickness of 100 Å as an orientation control film (not shown), which were then applied with rubbing. An opposed substrate was made to comprise a substrate not having the color filter of Example 1, and silica beads of 1.5 µm in diameter were scattered between the both substrates. Thereafter, they were laminated so that the rubbing directions may be the same, and then ferroelectric liquid crystal CS1014 (trade name; a product of Chisso Corporation) as the liquid crystal was injected into the cell. The cell thus prepared was placed between polarizers which were in a crossed nicols. While making observation on back light, signals were applied to the electrodes. As a result, short (or abnormal connection) was nowhere to be found. There was also little waveform dullness of the applied signals to picture elements. Moreover, the space between picture elements was perfectly light-screened, so that there was a remarkable improvement in the color purity in the color display. Not so great temperature irregularity was also occurred in the cell when signals were applied to the cell for a long period of time, and there was obtained a stable image quality.

As having been described in the above, the present invention makes it possible to greatly decrease the wiring resistance at the continuous electrode area without causing any short, when compared with conventional methods. Hence, the waveform dullness of the signals applied to the electrode area can be suppressed. In addition, since the heat generation in the cell can also be lessened, the temperature irregularity in the cell can be made small. Thus, the display quality level can be greatly improved.

At the same time, the light passing between picture elements can be perfectly intercepted, so that the deterioration of image quality, due to the light coming through between picture elements, can be prevented.

We claim:

1. A functional substrate prepared by a process comprising:
    a first step of forming on a substrate a first opaque metal or alloy film having been subjected to patterning to a first pattern form;
    a second step of providing a first photosensitive colored resin film on the substrate having said first opaque metal or alloy film;
    a third step of subjecting the first photosensitive colored resin film formed in said second step, through a first opaque metal or alloy film in the form of the first pattern as a mask, to exposure from the back side of the substrate, and removing the first photosensitive colored resin film formed on the first opaque metal or alloy film to leave the first colored resin film on which the first opaque metal or alloy film is not formed;

a fourth step of forming a second opaque metal or alloy film having been subjected to patterning to a second pattern form, on the substrate having the first colored resin film having been subjected to patterning in said third step and the first opaque metal or alloy film;

a fifth step of forming a second photosensitive colored resin film on the substrate having said second opaque metal or alloy film;

a sixth step of subjecting the second photosensitive colored resin film formed in said fifth step, through a second opaque metal or alloy film in the form of the second pattern as a mask, to exposure from the back side of the substrate, and removing the second photosensitive colored resin film formed on the second opaque metal or alloy film to leave the second colored resin film on which the second opaque metal or alloy film is not formed;

a seventh step of removing the second opaque metal or alloy film; and an eighth step of providing on the first and second colored resin films, transparent conductive films insulated from each other, in the state that they are electrically connected to the first opaque metal or alloy film.

2. A process for the preparation of a color filter, comprising:

a first step of forming on a substrate a first opaque metal or alloy film having been subjected to patterning to a first pattern form;

a second step of providing a first photosensitive colored resin film on the substrate having said first opaque metal or alloy film;

a third step of subjecting the first photosensitive colored resin film formed in said second step, through a first opaque metal or alloy film in the form of the first pattern as a mask, to exposure from the back side of the substrate, and removing the first photosensitive colored resin film formed on the first opaque metal or alloy film to leave the first colored resin film on which the first opaque metal or alloy film is not formed;

a fourth step of forming a second opaque metal or alloy film having been subjected to patterning to a second pattern form, on the substrate having the first colored resin film having been subjected to patterning in said third step and the first opaque metal or alloy film;

a fifth step of forming a second photosensitive colored resin film on the substrate having said second opaque metal or alloy film;

a sixth step of subjecting the second photosensitive colored resin film formed in said fifth step, through a second opaque metal or alloy film in the form of the second pattern as a mask, to exposure from the back side of the substrate, and removing the second photosensitive colored resin film formed on the second opaque metal or alloy film to leave the second colored resin film on which the second opaque metal or alloy film is not formed;

a seventh step of forming a third opaque metal or alloy film having been subjected to patterning to a third pattern form;

an eighth step of forming a third photosensitive colored resin film on the substrate having said third opaque metal or alloy film;

a ninth step of subjecting the third photosensitive colored resin film formed in said eighth step, through a third opaque metal or alloy film in the form of the third pattern as a mask, to exposure from the back side of the substrate, and removing the third photosensitive colored resin film formed on the third opaque metal or alloy film to leave the third colored resin film on which the third opaque metal or alloy film is not formed;

a tenth step of removing the second and third opaque metal or alloy films; and an eleventh step of providing on the first, second and third colored resin films, transparent conductive films insulated from each other, in the state that they are electrically connected to the first opaque metal or alloy film.

3. The process for the preparation of a color filter according to claim 2, wherein said first and second opaque low-resistivity films are formed of metals or alloys different from each other.

4. The process for the preparation of a color filter according to claim 2, wherein said first, second and third colored resin films are colored in different colors from each other.

5. A process for the preparation of a color filter, comprising:

a first step of forming on a substrate a first opaque metal or alloy film having been subjected to patterning to a first pattern form;

a second step of providing a first photosensitive colored resin film on the substrate having said first opaque metal or alloy film;

a third step of subjecting the first photosensitive colored resin film formed in said second step, through a first opaque metal or alloy film in the form of the first pattern as a mask, to exposure from the back side of the substrate, and removing the first photosensitive colored resin film formed on the first opaque metal or alloy film to leave the first colored resin film on which the first opaque metal or alloy film is not formed;

a fourth step of forming a second opaque metal or alloy film having been subjected to patterning to a second pattern form, on the substrate having the first colored resin film having been subjected to patterning in said third step and the first opaque metal or alloy film;

a fifth step of forming a second photosensitive colored resin film on the substrate having said second opaque metal or alloy film;

a sixth step of subjecting the second photosensitive colored resin film formed in said fifth step, through a second opaque metal or alloy film in the form of the second pattern as a mask, to exposure from the back side of the substrate, and removing the second photosensitive colored resin film formed on the second opaque metal or alloy film to leave the second colored resin film on which the second opaque metal or alloy film is not formed;

a seventh step of removing the second opaque metal or alloy film; and an eighth step of providing on the first and second colored resin films, transparent conductive films insulated from each other, in the state that they are electrically connected to the first opaque metal or alloy film.

6. The process for the preparation of a color filter according to claim 5, wherein said first and second opaque low-resistivity films are formed of metals or alloys different from each other.

* * * * *

UNITED STATES PATENT AND TRADEMARK OFFICE
CERTIFICATE OF CORRECTION

PATENT NO. : 5,650,867

DATED : July 22, 1997

INVENTOR(S): MAKOTO KOJIMA ET AL.

It is certified that error appears in the above-identified patent and that said Letters Patent is hereby corrected as shown below:

COLUMN 1

Line 31, "4,638,088" should read --4,639,089--.

COLUMN 2

Line 16, "disply" should read --display--.

COLUMN 5

Line 45, "182 m." should read --$\mu$m.--.

COLUMN 6

Line 57, "and respectively," should read --and 1B, respectively,--.

COLUMN 8

Line 39, "In" (second occurrence) should read --in--.

COLUMN 9

Line 42, "spin Thereafter" should read --spin coating. Thereafter--;

Line 44, "substrate aligned" should read --substrate is aligned--.

UNITED STATES PATENT AND TRADEMARK OFFICE
CERTIFICATE OF CORRECTION

PATENT NO. : 5,650,867

DATED : July 22, 1997

INVENTOR(S): MAKOTO KOJIMA ET AL.

It is certified that error appears in the above-identified patent and that said Letters Patent is hereby corrected as shown below:

COLUMN 11

Line 8, "fist" should read --first--.

COLUMN 14

Line 41, "produce" should read --product--.

COLUMN 17

Line 62, "Instance" should read --instance--.

COLUMN 18

Line 19, "optionally provided" should read --optionally be provided--.

COLUMN 20

Line 54, "n" should read --$n^+$--.

COLUMN 22

Line 47, "Layer" should read --layer--.

UNITED STATES PATENT AND TRADEMARK OFFICE
CERTIFICATE OF CORRECTION

PATENT NO. : 5,650,867

DATED : July 22, 1997

INVENTOR(S) : MAKOTO KOJIMA ET AL.

It is certified that error appears in the above-identified patent and that said Letters Patent is hereby corrected as shown below:

COLUMN 28

```
Line 1, "content:  solvent" should read
  --content:  10%; solvent--;
Line 15, "Green" should read --green--.
```

Signed and Sealed this

Tenth Day of March, 1998

Attest:

BRUCE LEHMAN

*Attesting Officer*       *Commissioner of Patents and Trademarks*